United States Patent
Amano et al.

(10) Patent No.: US 8,713,115 B2
(45) Date of Patent: Apr. 29, 2014

(54) SENDING NOTIFICATION OF EVENT

(75) Inventors: Takehiko Amano, Kawasaki (JP); Yoshio Horiuchi, Kanagawa (JP); Ken Kumagai, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 13/307,617

(22) Filed: Nov. 30, 2011

(65) Prior Publication Data

US 2012/0158871 A1   Jun. 21, 2012

(30) Foreign Application Priority Data

Dec. 21, 2010   (JP) ................................ 2010-284688

(51) Int. Cl.
  *G06F 15/16*   (2006.01)
(52) U.S. Cl.
  USPC ............................ 709/206; 709/248; 370/412
(58) Field of Classification Search
  USPC .................................. 709/206, 248; 370/412
  See application file for complete search history.

(56) References Cited

U.S. PATENT DOCUMENTS

| | | | | |
|---|---|---|---|---|
| RE35,922 E | * | 10/1998 | Cuzzo et al. ................ | 358/1.14 |
| 5,938,749 A | * | 8/1999 | Rusu et al. ...................... | 710/54 |
| 6,075,791 A | * | 6/2000 | Chiussi et al. ................ | 370/412 |
| 6,684,195 B1 | * | 1/2004 | Deaton et al. ............. | 705/14.13 |
| 7,475,121 B2 | | 1/2009 | Ushigusa | |
| 8,554,857 B2 | | 10/2013 | Amano et al. | |
| 2002/0095466 A1 | | 7/2002 | Ushigusa | |
| 2004/0243763 A1 | * | 12/2004 | Peters et al. ................ | 711/114 |
| 2005/0195975 A1 | * | 9/2005 | Kawakita ........................ | 380/30 |
| 2006/0277019 A1 | | 12/2006 | Ganesan et al. | |
| 2009/0055891 A1 | | 2/2009 | Okamoto et al. | |
| 2009/0083444 A1 | * | 3/2009 | Faist ............................ | 709/248 |
| 2010/0153634 A1 | | 6/2010 | Fellinger et al. | |
| 2010/0332531 A1 | | 12/2010 | Galande | |
| 2012/0173617 A1 | | 7/2012 | Amano et al. | |

FOREIGN PATENT DOCUMENTS

| | | |
|---|---|---|
| JP | 11184929 A | 7/1999 |
| JP | 2002207669 A | 7/2002 |
| JP | 2003186807 A | 7/2003 |
| JP | 2003198627 A | 7/2003 |
| JP | 3821710 B2 | 9/2006 |
| JP | 2007004781 A | 1/2007 |

* cited by examiner

*Primary Examiner* — Wing F Chan
*Assistant Examiner* — Benjamin M Thieu
(74) *Attorney, Agent, or Firm* — Marcia L. Doubet

(57) ABSTRACT

Usability is improved by decreasing the number of notifications to be read in receiving mails including notifications of events. A notification of an event is sent. In one aspect, this comprises receiving, in response to occurrence of an event, a notification of the event; storing, when event data generated from the received notification matches a conditional expression in a profile associated with the event, the notification of the event in a queue associated with at least one of change management information corresponding to the event and a recipient of the change management information; and sending, when an earliest time out of transfer times set in respective notifications stored in the queue has come, all the notifications stored in the queue, to a client that is the recipient, as a single notification.

18 Claims, 24 Drawing Sheets

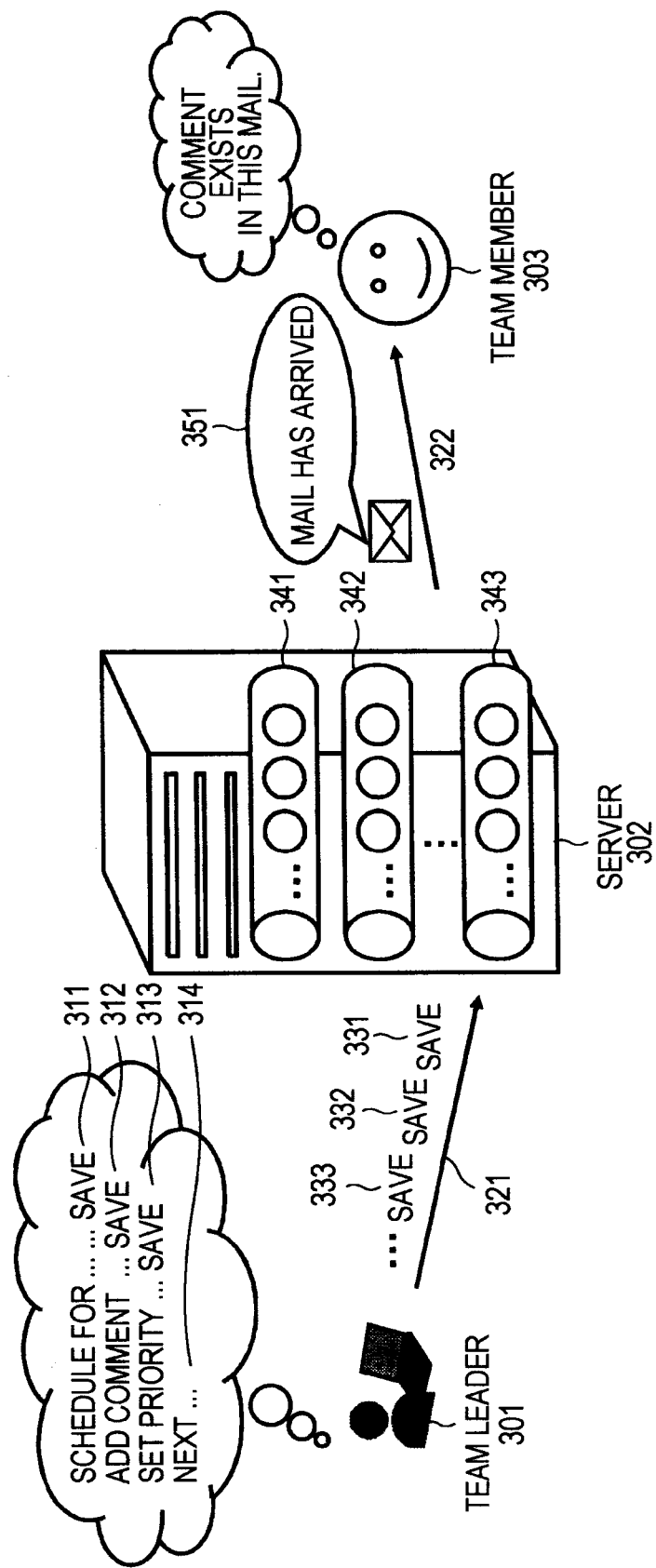

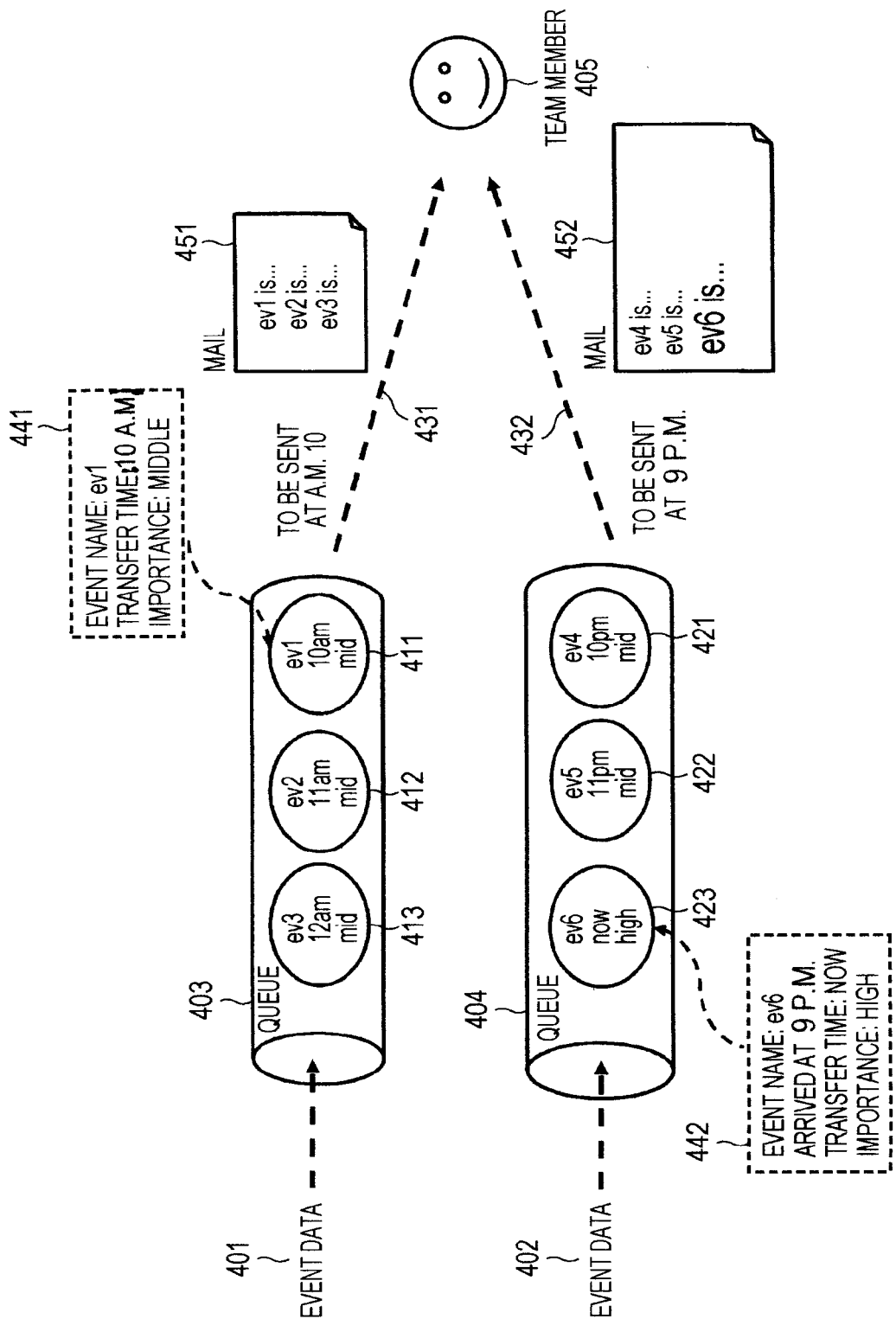

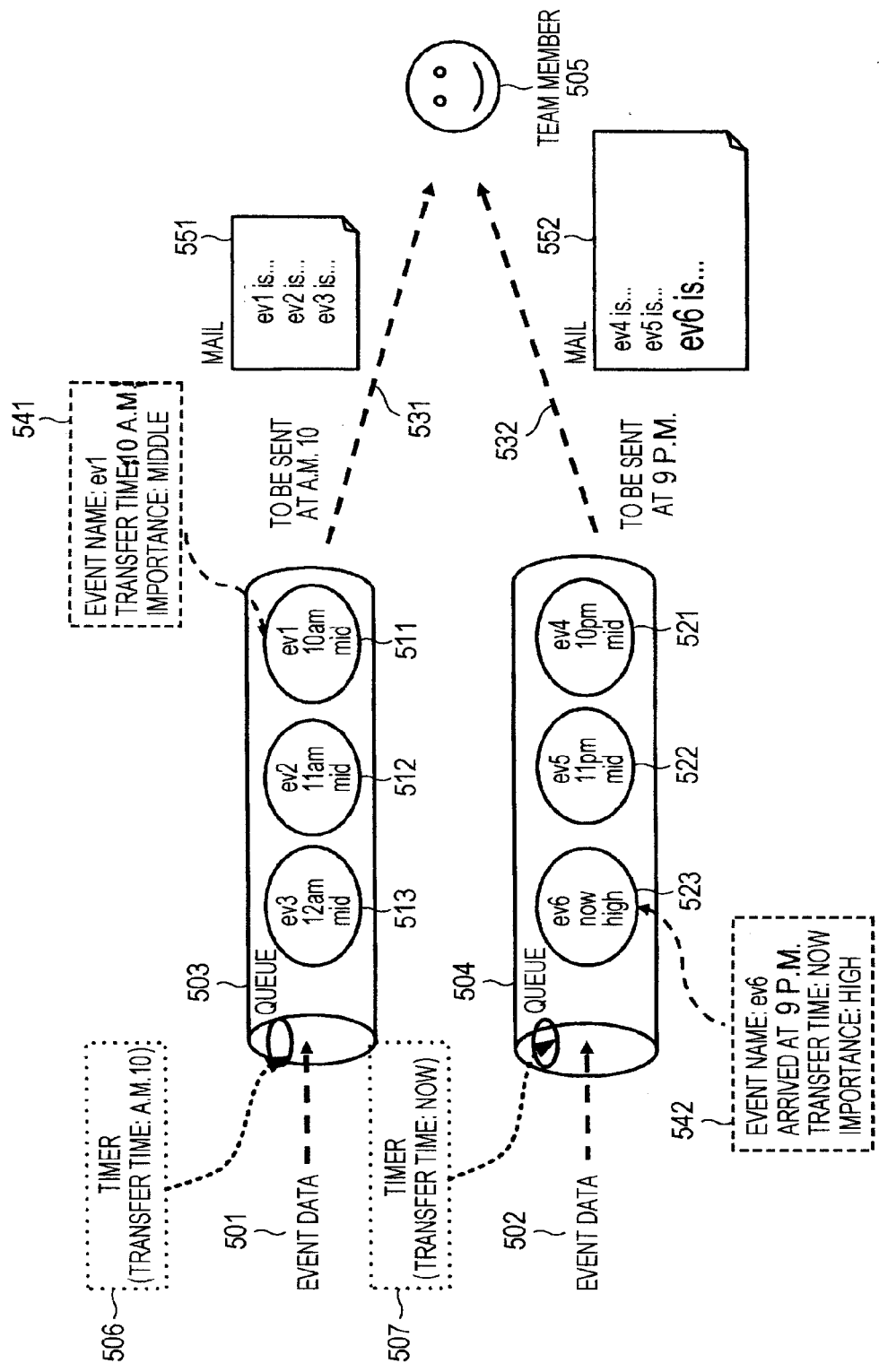

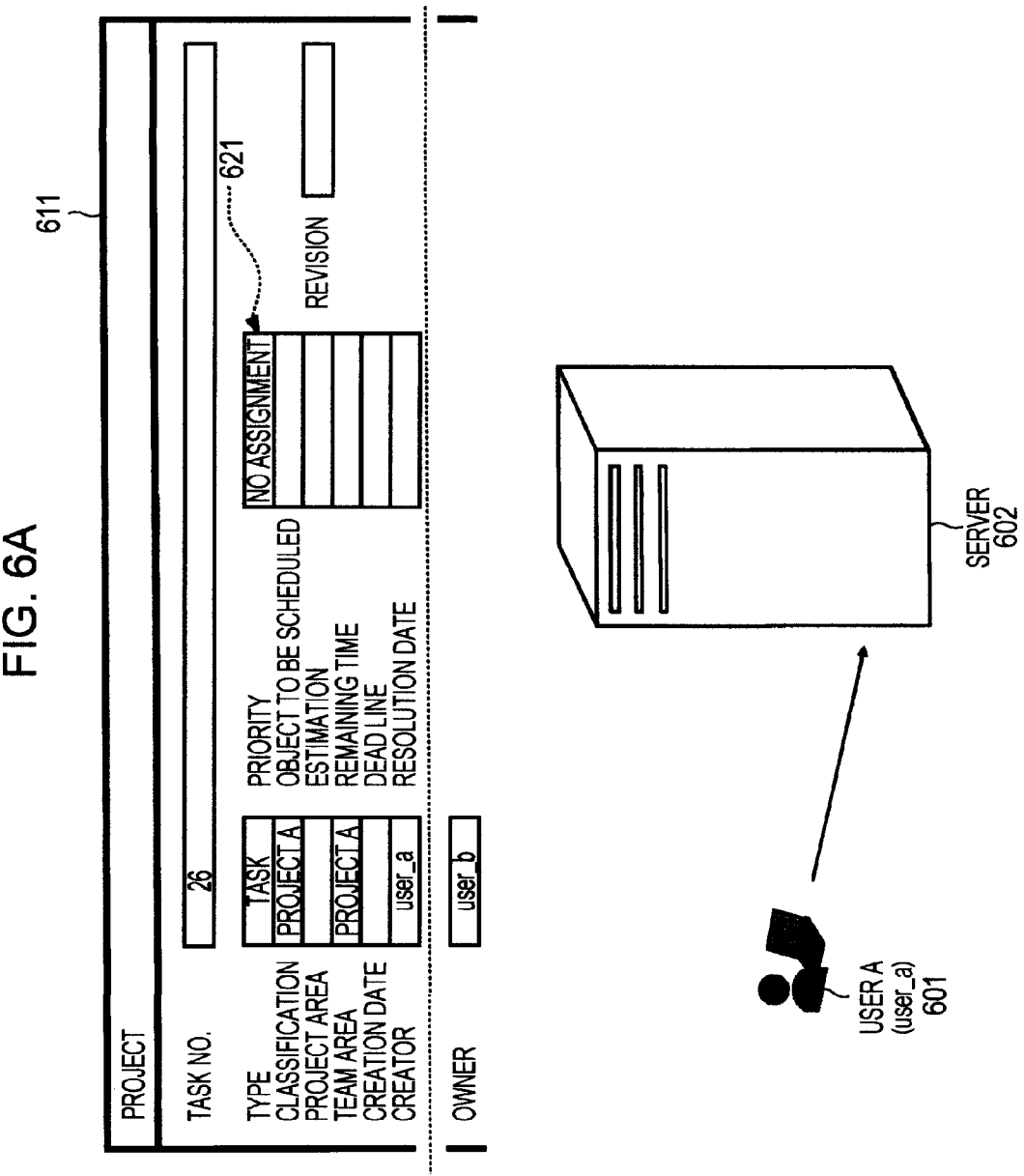

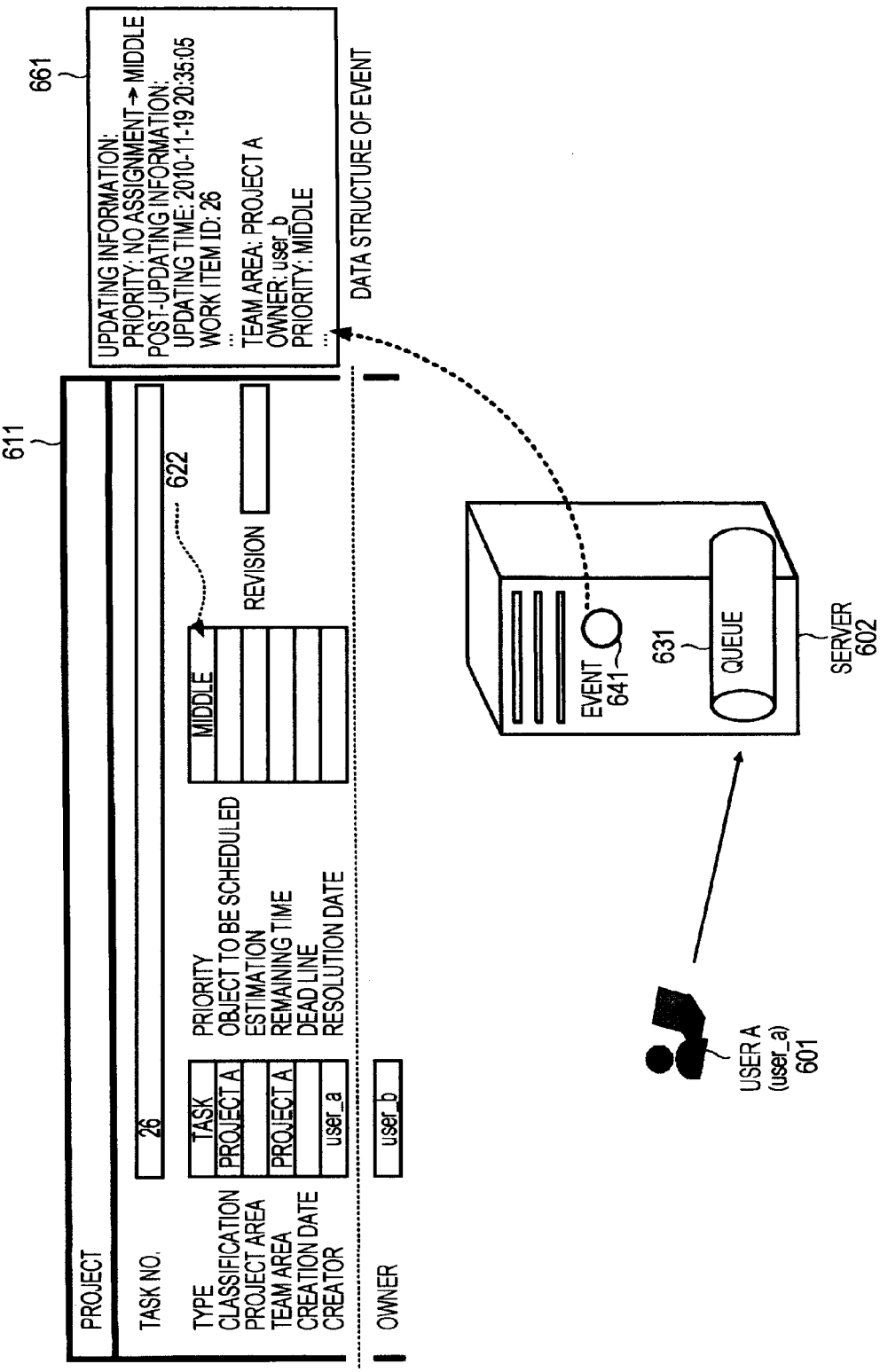

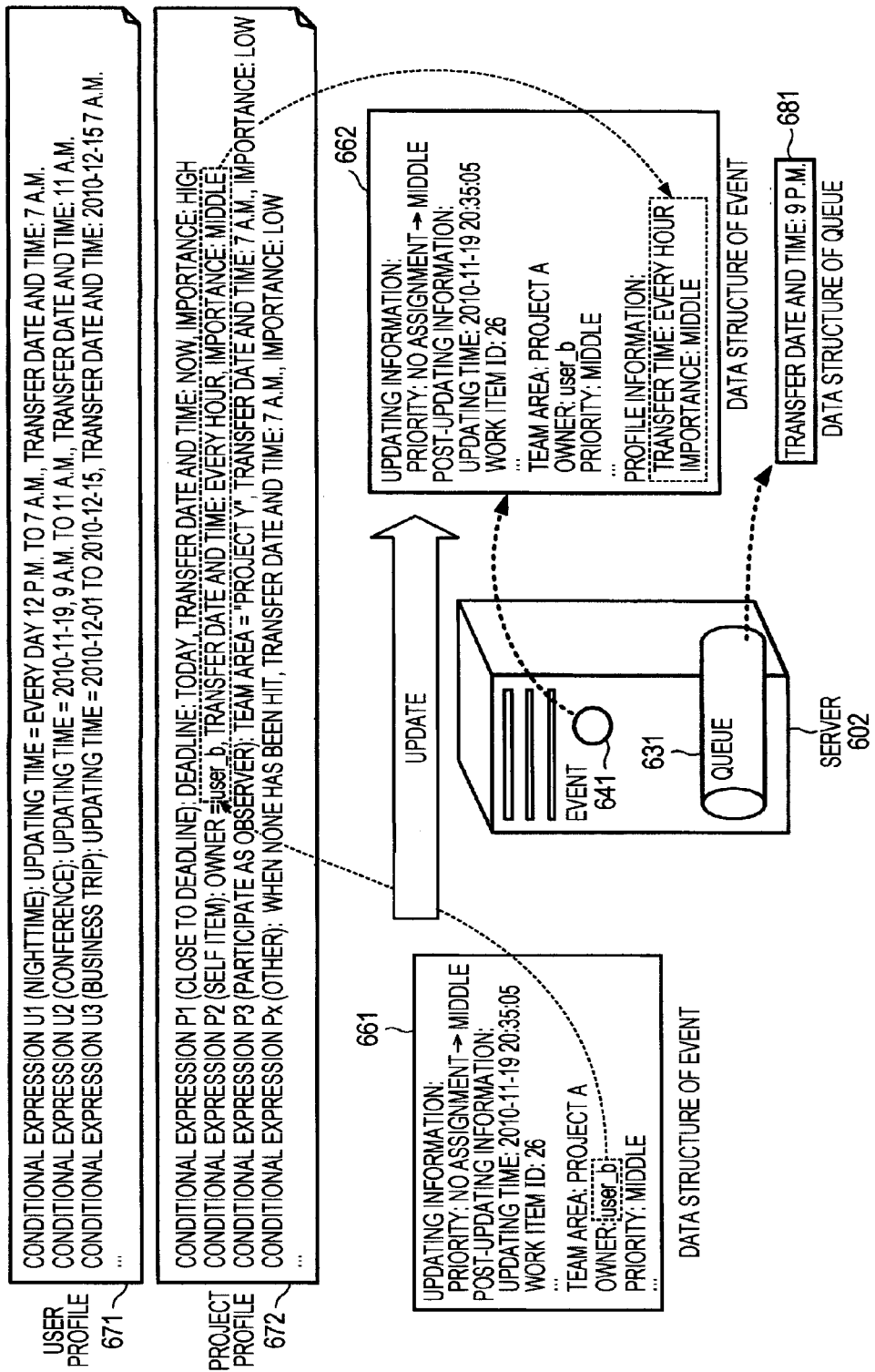

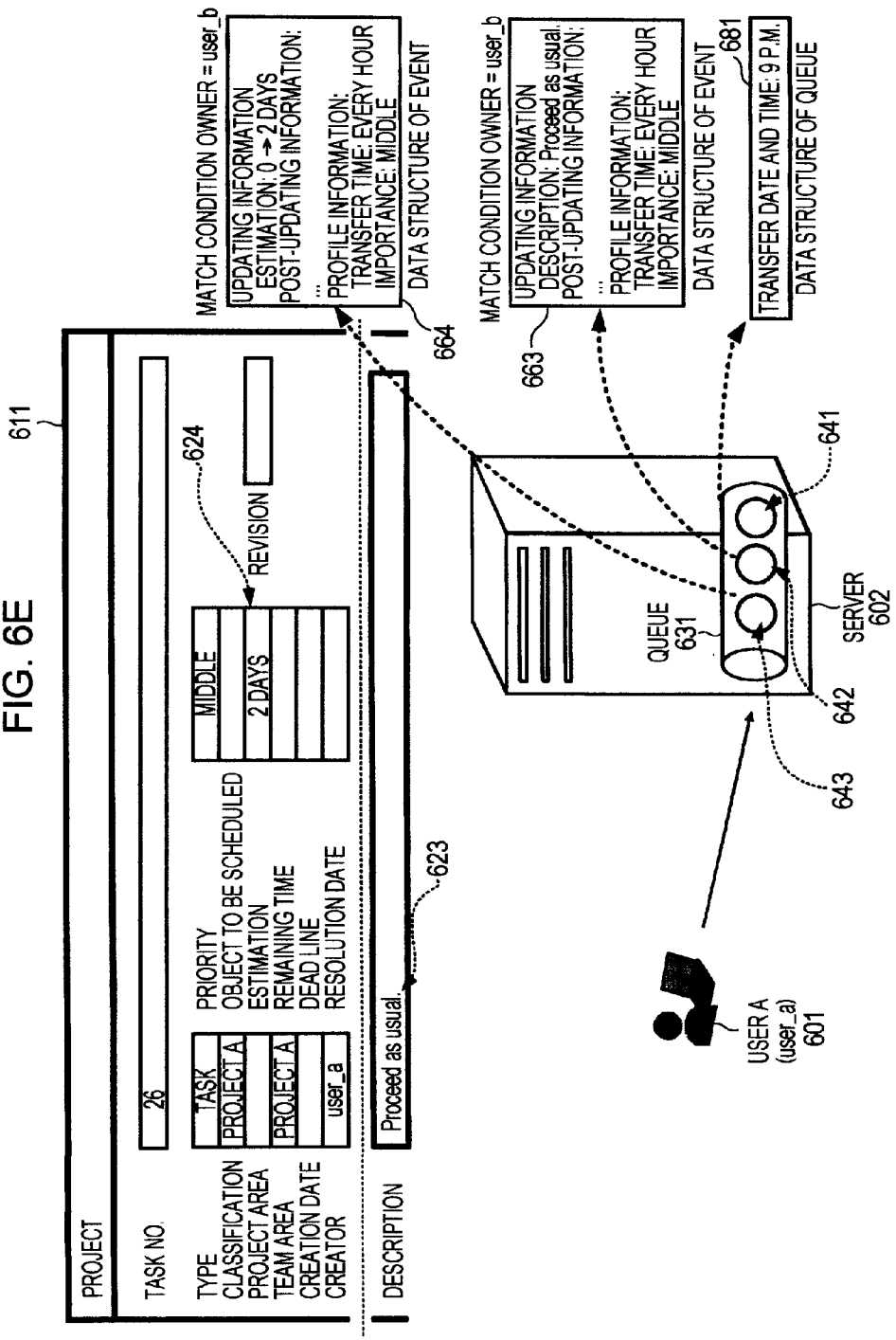

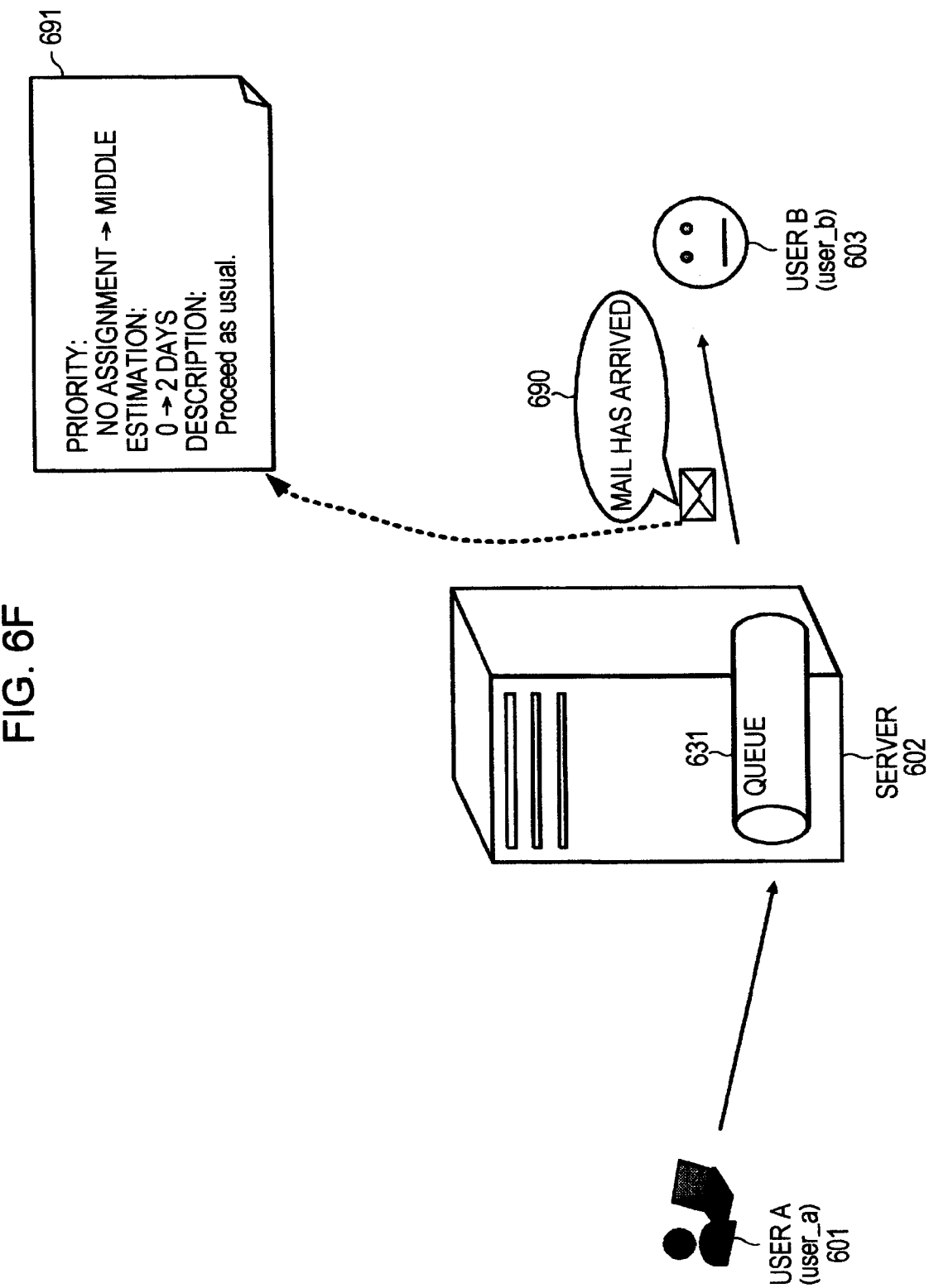

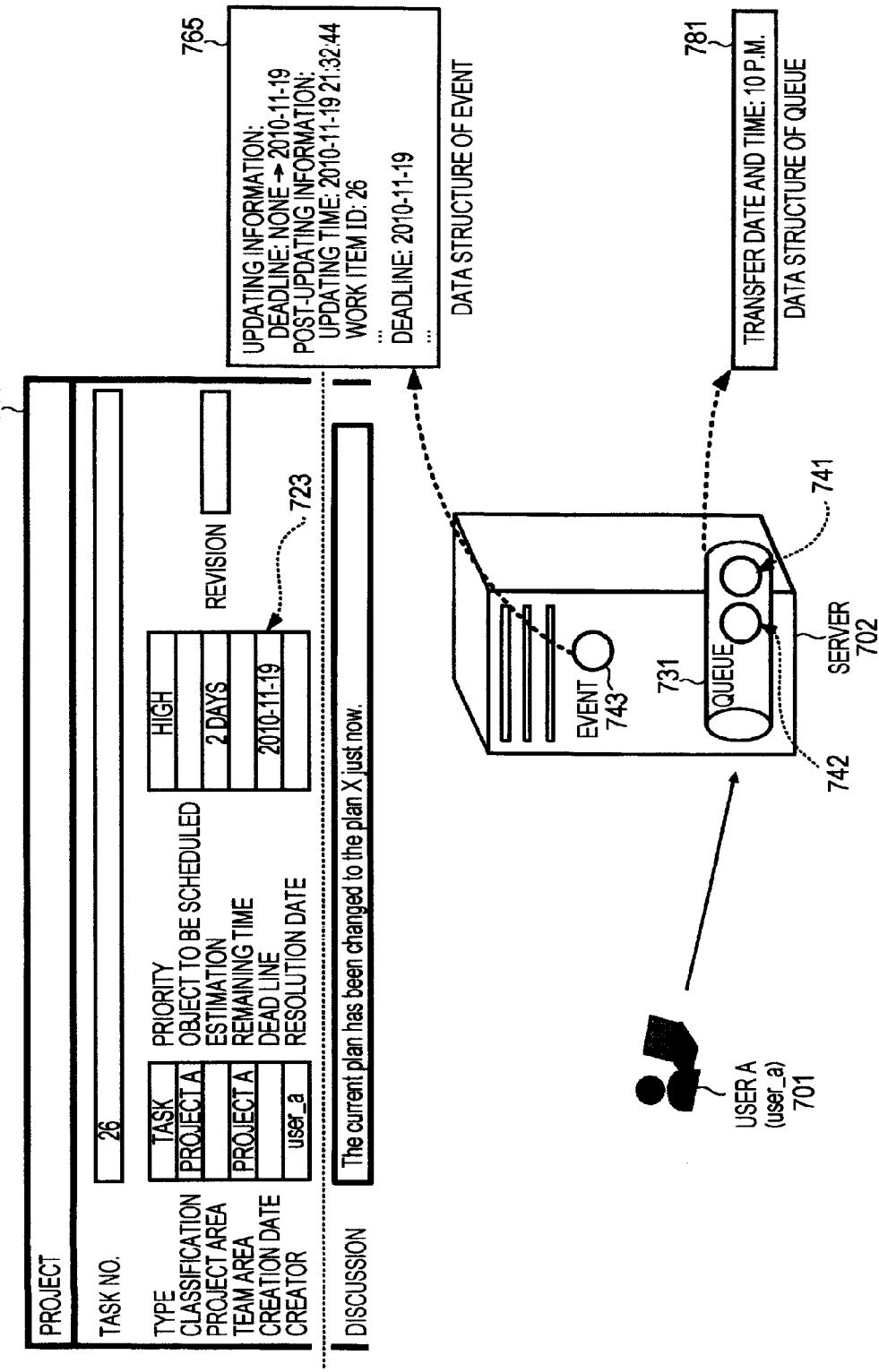

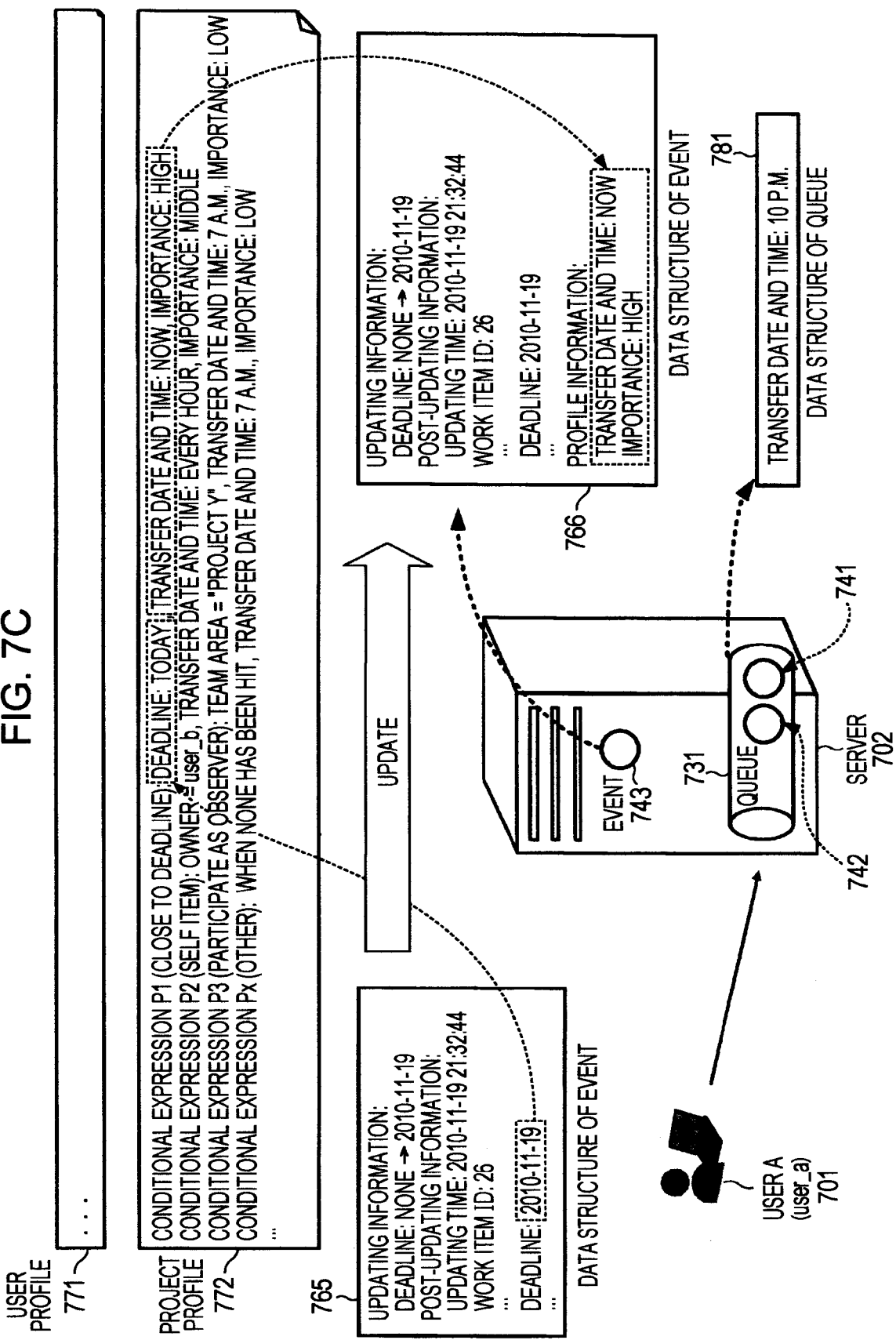

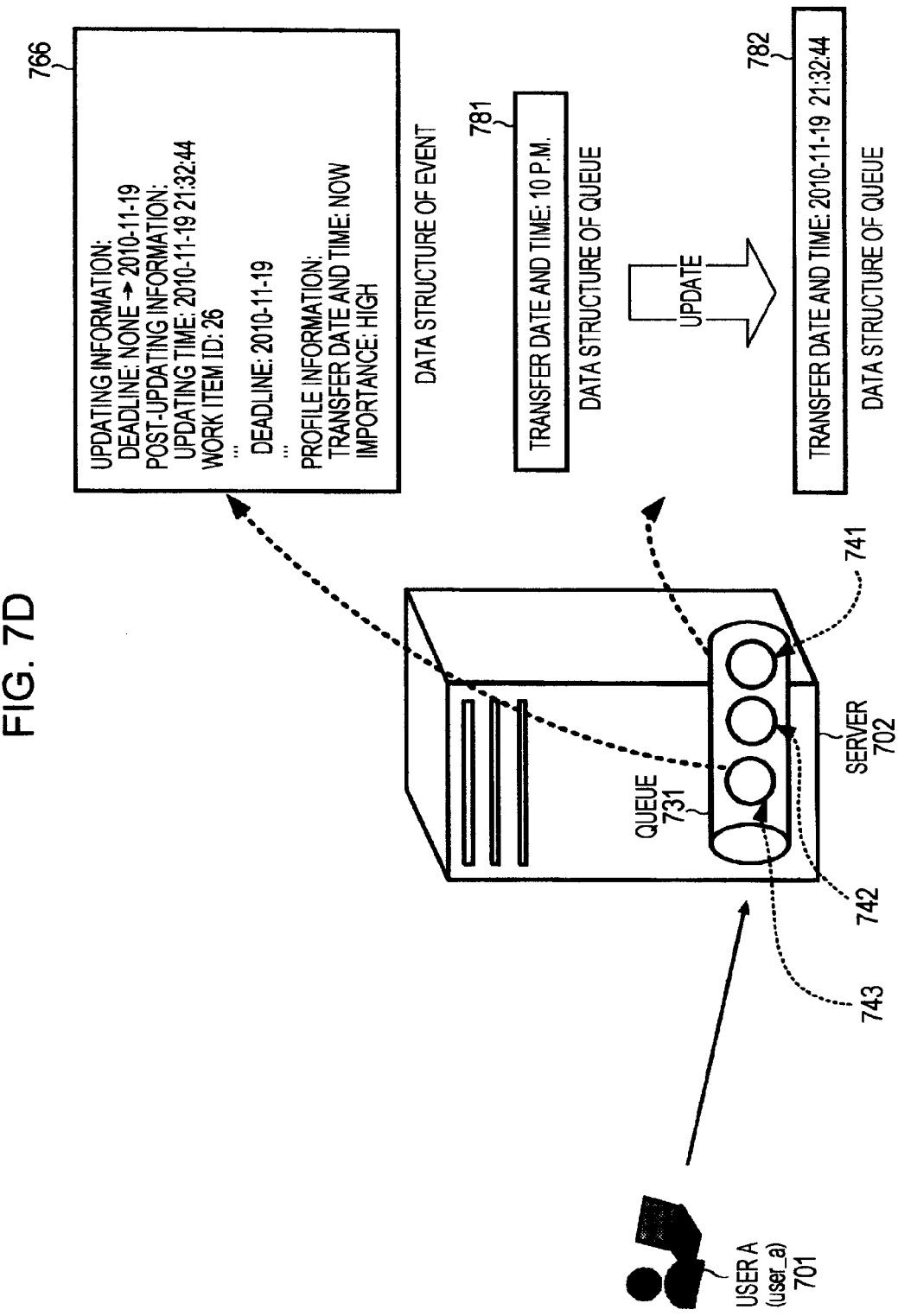

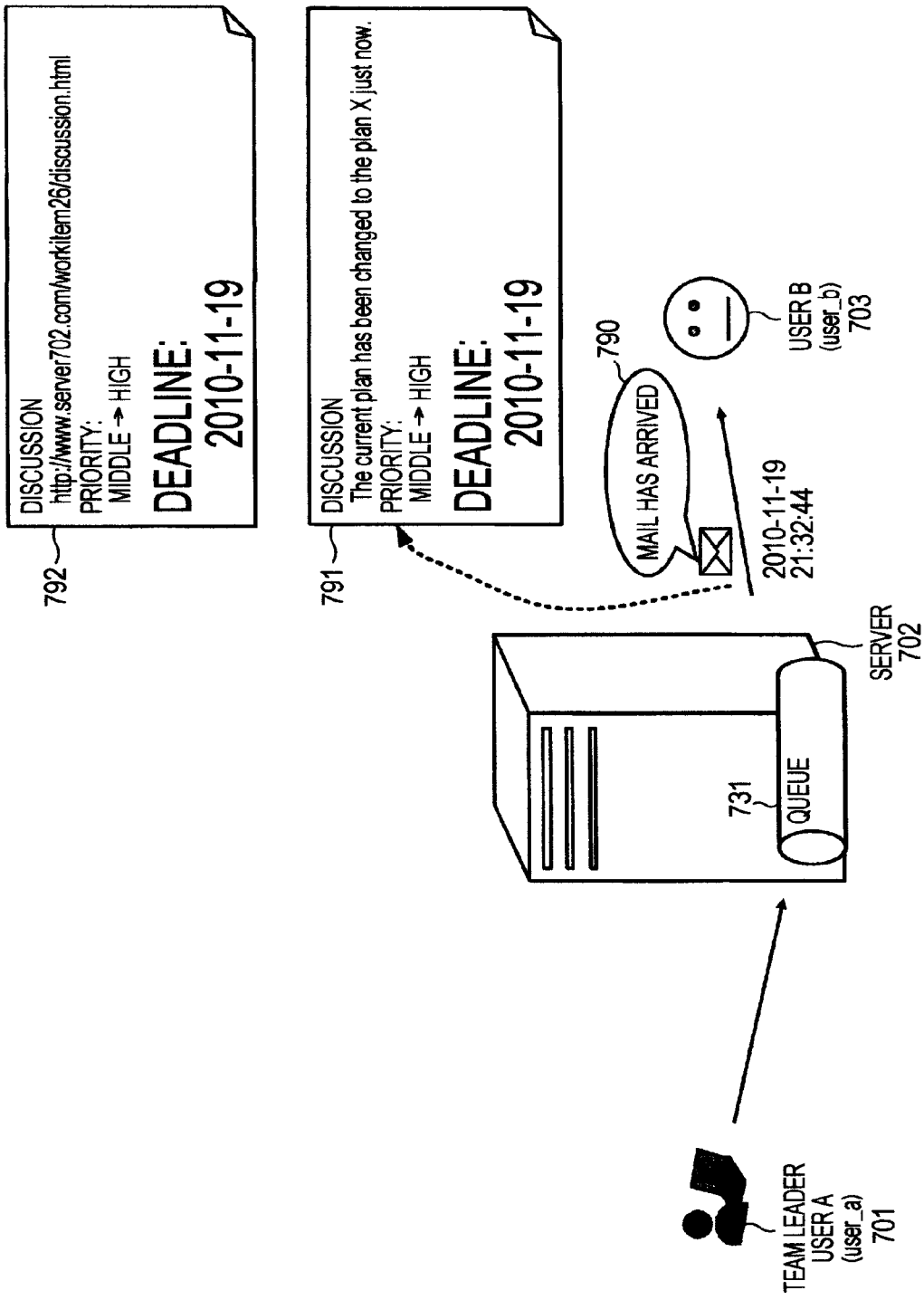

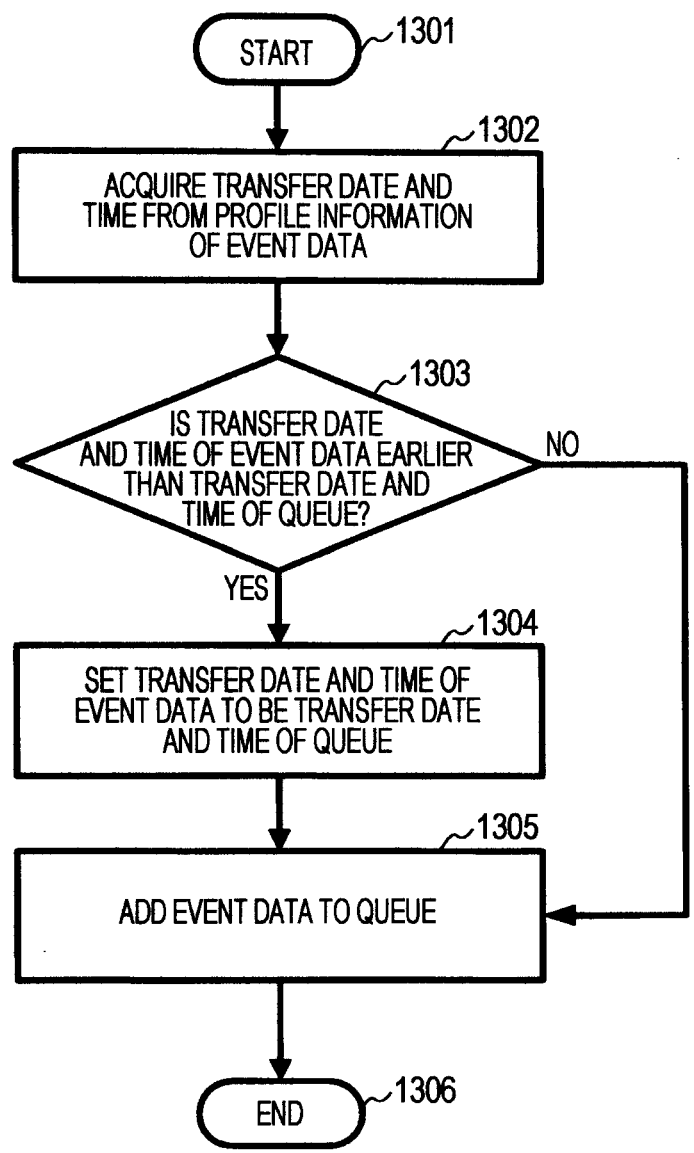

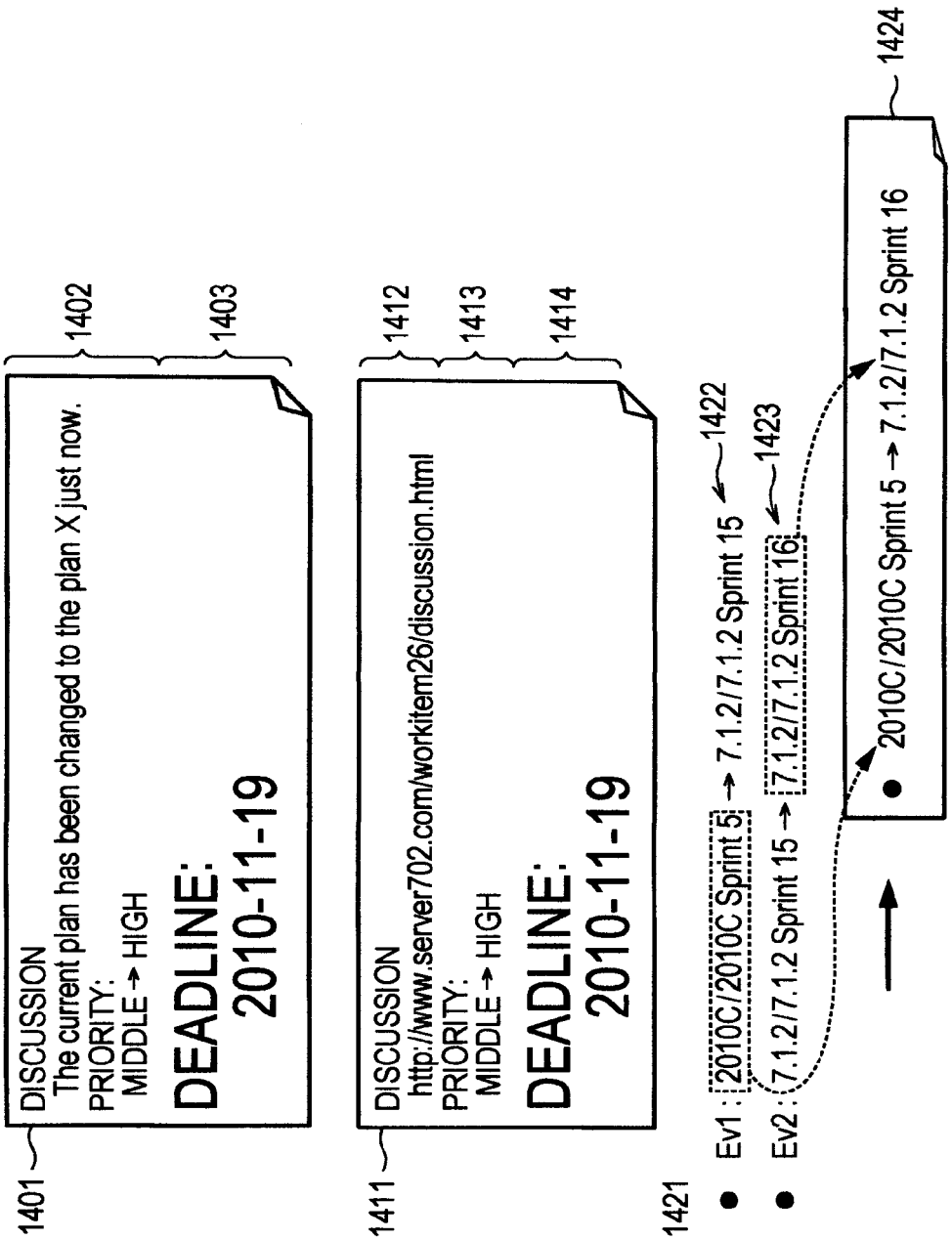

US 8,713,115 B2

SENDING NOTIFICATION OF EVENT

BACKGROUND

The present invention relates to techniques for sending a notification of an event. In particular, the present invention relates to sending a notification of an event to a client that is a recipient of change management information corresponding to the event (hereinafter also called a destination client).

In an application involving occurrence of events, for example an application for performing software development in collaboration, every time a team leader generates an event, a notification (e.g., an electronic mail or an instant message) corresponding to the event is sent to a team member who is a recipient (e.g., a reader or subscriber of a change management system).

BRIEF SUMMARY

The present invention is directed to improving the usability for a mail recipient by decreasing the number of mails to be read by a team member who is a recipient of mails including notifications of events, and enabling a team member to readily recognize an important event description in the aforementioned mails. In one aspect, this comprises: storing, when event data generated from a received notification of an event matches a conditional expression in a profile associated with the event, the event data in a queue associated with at least one of change management information corresponding to the event and a recipient of the change management information; and sending, when a determined transfer time has come, all the pieces of event data stored in the queue, to a client (a destination client) that is the recipient, as a single notification. The determined transfer time preferably comprises an earliest time out of transfer times set in respective pieces of event data stored in the queue or an earliest time out of transfer times for the queue. The event data preferably comprises updating information corresponding to the event, the updating information comprising a name of an attribute updated by a user at the originating client and before and after values of the attribute. The storing preferably includes setting a transfer time in the event data on the basis of the profile.

BRIEF DESCRIPTION OF THE SEVERAL VIEWS OF THE DRAWINGS

FIG. 3 illustrates a situation in which, according to an embodiment of the present invention, pieces of data entered by a team leader are sent to a server as messages, and the server sends a single notification corresponding to pieces of event data created from the respective messages to a team member who is a recipient.

FIG. 4 illustrates a situation in which, according to an embodiment of the present invention, in each queue prepared in a server, when the earliest time out of transfer times set in respective pieces of event data stored in the queue has come, all the pieces of event data stored in the queue are sent to a team member as a single notification.

FIG. 5 illustrates a situation in which, according to an embodiment of the present invention, in each queue prepared in a server, when the earliest time out of transfer times set for the queue has come, all pieces of event data stored in the queue are sent to a team member as a single notification.

FIGS. 6A-6F provide illustrations describing a case where, according to an embodiment of the present invention, in a queue provided in a server, the transfer time is not updated by subsequent event data.

FIGS. 7A-7E provide illustrations describing a case where, according to an embodiment of the present invention, in a queue provided in a server, the transfer time is updated by subsequent event data.

FIG. 13 illustrates a flowchart of a process, according to an embodiment of the present invention, of adding event data to a queue.

FIG. 14 illustrates a situation in which, according to an embodiment of the present invention, a plurality of pieces of event data in a queue are combined into a single notification.

DETAILED DESCRIPTION

Figure 1:
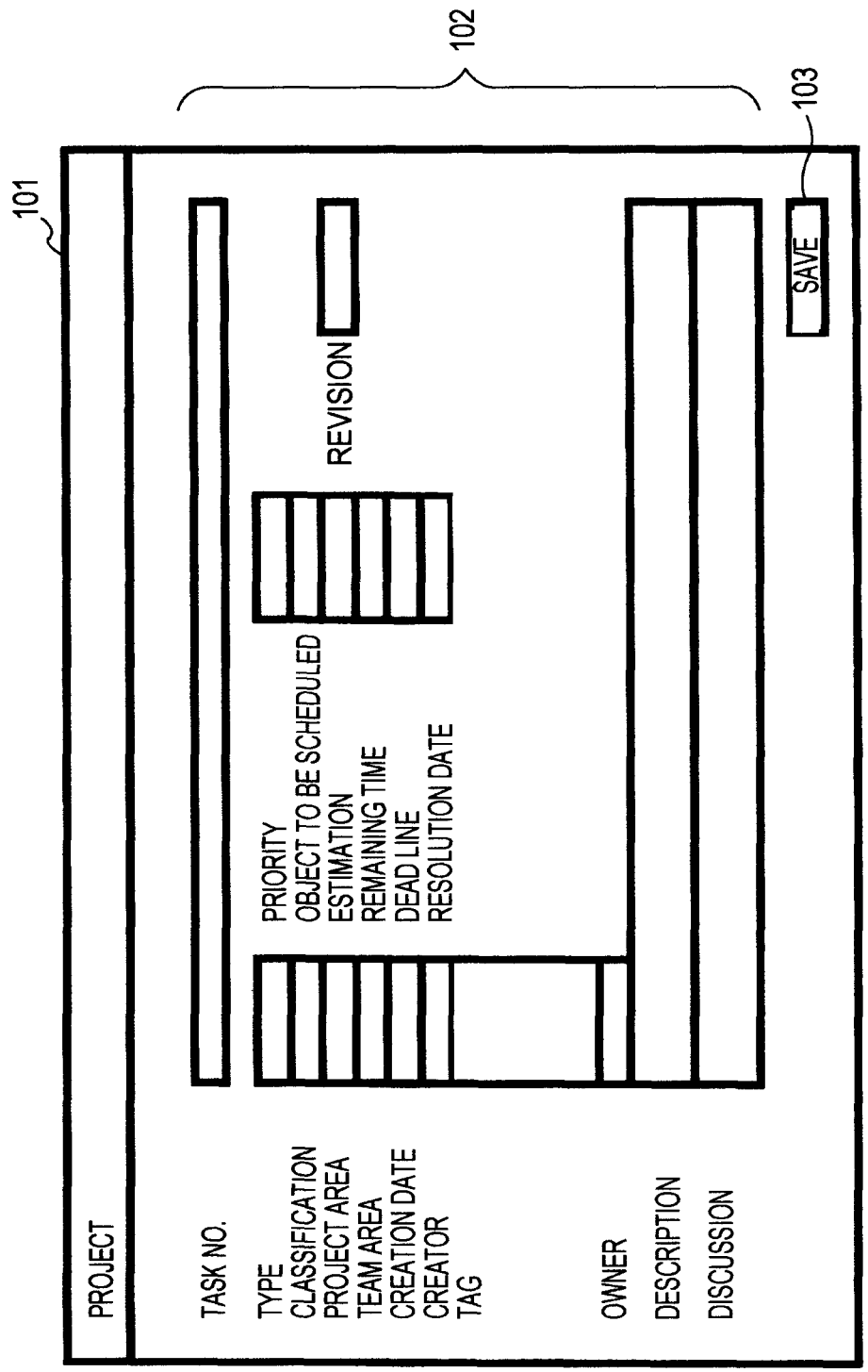
FIG. 1 illustrates an exemplary interface of a user screen of an application involving occurrence of events.

According to preferred embodiments of the present invention, pieces of event data having been generated from respective notifications corresponding to events and queued to a server are combined to be sent to a team member who is a recipient, at a time specified by a scheduler, as a single notification (hereinafter also called a summary mail). Thus, the number of notifications received by a team member from a server can be reduced. This may also reduce the network load. Moreover, the event description of important event data may be highlighted in the summary mail. Accordingly, the probability of a team member missing the event description of important event data is reduced.

Embodiments of the present invention will now be described referring to the drawings. Unless otherwise specified, the same reference numbers denote the same components throughout the drawings referenced below. It is to be understood that the embodiments of the present invention are described as preferred aspects of the present invention and are not intended to limit the scope of the present invention thereto.

FIG. 1 illustrates an exemplary interface of a user screen of an application involving occurrence of events. The application may be, for example, collaboration software for performing software development in collaboration. A team leader can activate the user screen (101) related to an assigned project and enter data in various types of records (102) related to the project in the user screen (101).

Typically, the user screen (101) may be displayed using a graphical user interface (GUI). The GUI may be an interface by an application involving occurrence of events or a web browser based interface.

The user screen (101) is an exemplary item edit screen of an application for performing software development in collaboration. The user screen includes various types of records (102) related to a project and a button (103) including a function of saving entered data. It should be noted that the content of the various types of records (102) shown in FIG. 1 is illustrative but not limiting. The items of the various types of records may be appropriately changed by persons skilled in the art in a manner that depends on the characteristics of the application involving occurrence of events. A user, for example a team leader, can enter or edit data corresponding to the various types of records directly or enter data in the various types of records by selecting predetermined items.

The user may click the save button (103) with, for example, a mouse every time the user enters one or more pieces of data into the various types of records. Alternatively, the same instruction as that issued when the save button (103) is clicked may be input to a computer automatically after a predetermined time elapses.

Figure 2:
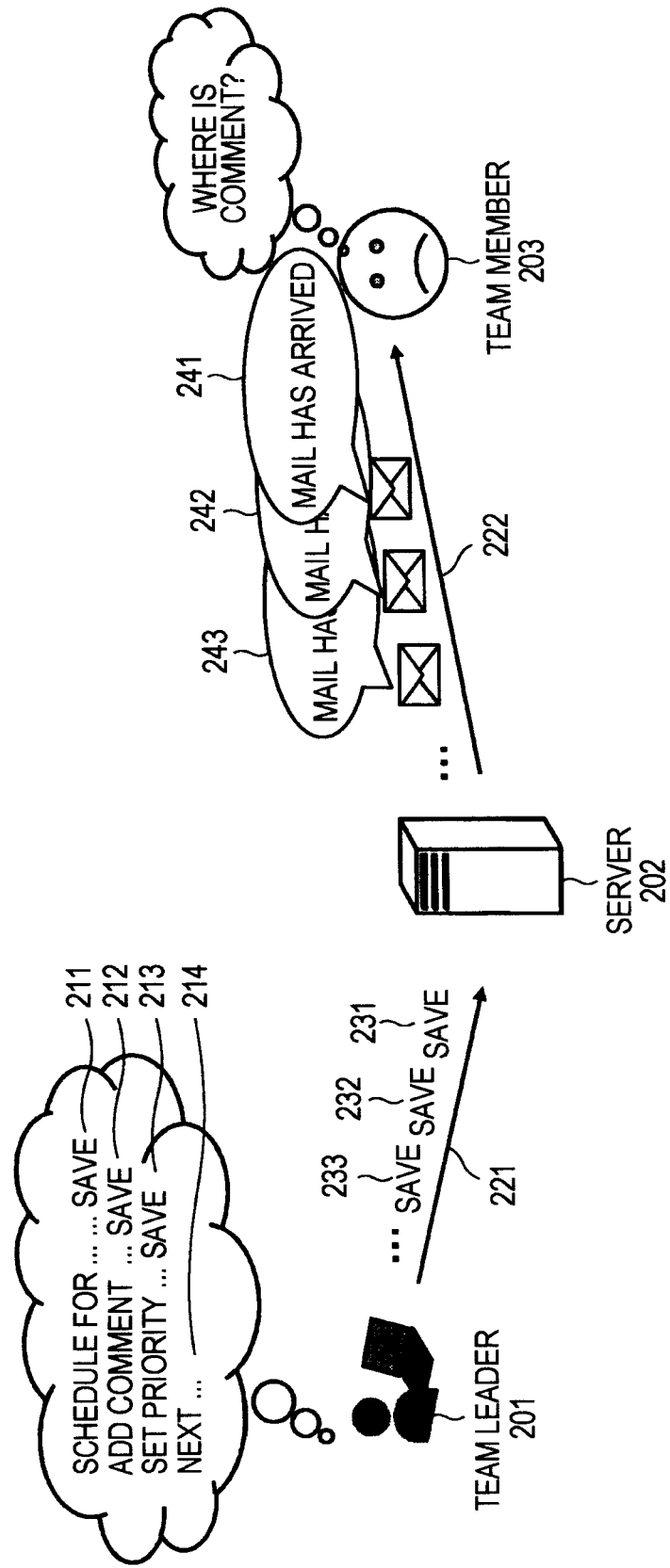
FIG. 2 illustrates a situation in which pieces of data entered by a team leader are sent to a server as messages, and the server sends mails corresponding to pieces of event data created from the respective messages to a team member who is a recipient.

FIG. 2 illustrates a situation in which pieces of data entered by a team leader are sent to a server as messages (221), and the server sends mails (222) corresponding to pieces of event data created from the respective first messages to a team member who is a recipient.

A computer of a team leader (201) is connected to a server (202) via a network. Similarly, the server (202) is connected to at least one computer of a team member (203) via the network.

The team leader (201) may save entered data every time the team leader (201) edits one or more records or repeatedly edits a single record (for example, refer to 211, 212, 213, and 214) so as to avoid loss of the entered data due to some hardware or software problem. Every time entered data is saved, the computer of the team leader (201) sends (221) the entered data to the server (202) as messages (231, 232, and 233). The server (202) creates pieces of event data (not shown) corresponding to the messages (231, 232, and 233). Then, the server (202) creates mails (241, 242, and 243) corresponding to the pieces of event data and sends (222) the mails (241, 242, and 243) to the computer of the team member (203) who is a recipient. Thus, the computer of the team member (203) receives many mails corresponding to the number of pieces of event data. However, it may be inconvenient or difficult for the team member (203) to find a mail including information on an important event from among many mails. Moreover, sending many mails to the computer of the team member (203) may lead to a situation in which a mail including important information is missed due to not knowing about a mail of event data by the team member (203) or a mistake by the team member (203).

FIG. 3 illustrates a situation in which, according to an embodiment of the present invention, pieces of data entered by a team leader are sent to a server as messages, and the server sends a single notification corresponding to pieces of event data created from the respective messages to a team member who is a recipient. For example, when a server (302) is a change management system, a recipient is also called a reader or subscriber.

A computer of a team leader (301) is connected to the server (302) via a network. Similarly, the server (302) is connected to at least one computer of a team member (303) via the network. The network may be the Internet or an intranet. Moreover, the computer of the team leader (301) and the computer of the team member (303) may be connected to the server (302) by wire or wireless.

The team leader (301) may save entered data every time the team leader (301) edits one or more records or repeatedly edits a single record (311, 312, 313, and 314) so as to avoid loss of the entered data due to some hardware or software problem. Every time entered data is saved, the computer of the team leader (301) notifies the server (302) of the entered data, for example, sends (321) the entered data to the server (302) as messages (331, 332, and 333). The server (302) stores pieces of event data corresponding to the messages (331, 332, and 333) in at least one queue (for example, 341, 342, and 343) prepared for each work item or each of at least one recipient of a work item. Then, the server combines all the pieces of event data stored in each of the queues (341, 342, and 343) into a single notification (summary mail), for example a single electronic mail or a single instant message, for the queue. Then, the server (302) sends the single notification (322) to the at least one computer of the team member (303) who is a recipient associated with the queue. The single notification (322) may include all or some of the respective descriptions of the pieces of event data corresponding to the messages (331, 332, and 333). Unlike the situation shown in FIG. 2, the team member (303) does not receive a mail for each of the messages (331, 332, and 333). Thus, the number of mails to be read by the recipient is reduced. Accordingly, the usability for the team member is improved.

FIGS. 4 to 7E described below illustrate implementing the situation illustrated in FIG. 3 in more detail.

FIG. 4 illustrates a situation in which, according to an embodiment of the present invention, in each queue prepared in a server, when the earliest time out of transfer times set in respective pieces of event data stored in the queue has come, all the pieces of event data stored in the queue are sent to a team member as a single notification.

A queue (403) and a queue (404) are prepared in a memory of the server (302). The queue (403) is associated at least with one of first change management information (for example, a first work item) and a team member who is at least one recipient (for example, a team member (405)). The queue (404) is associated with one of second change management information (for example, a second work item) and a team member (for example, the team member (405)) who is at least one recipient. In each of the queues, pieces of event data are queued. Each piece of event data may include, for example, information on an event name, an event number, a transfer time (transfer date and time), an arrival date and time, and, optionally, the importance of event data.

In the queue (403), pieces of event data (411, 412, and 413) are queued. In the event data (411), the event name is "ev1", the transfer time is "10 a.m.", and the importance is "middle" (mid). In the event data (412), the event name is "ev2", the transfer time is "11 a.m.", and the importance is "middle" (mid). In the event data (413), the event name is "ev3", the transfer time is "12 a.m.", and the importance is "middle" (mid). Thus, the earliest time out of the respective transfer times of the pieces of event data (411, 412, and 413) stored in the queue (403) is "10 a.m.". Thus, when 10 a.m. has come, the server (302) combines the pieces of event data (411, 412, and 413) stored in the queue (403) at that time into a single mail (451) and sends (431) the single mail (451) to the team member (405). Moreover, since all the respective importances of the three pieces of event data (411, 412, and 413) are "middle", the respective descriptions of the pieces of event data (411, 412, and 413) may be combined in the single mail (451) so as to be displayed in the same size. The team member (405) receives only the single mail (451), instead of receiving three mails corresponding to the pieces of event data (411, 412, and 413). Thus, the load of checking mails by the team member (405) is reduced. Moreover, the communication cost of a communication path from the server (302) to the team member (405) is reduced.

In the queue (404), pieces of event data (421, 422, and 423) are queued. In the event data (421), the event name is "ev4", the transfer time is "10 p.m.", and the importance is "middle" (mid). In the event data (422), the event name is "ev5", the transfer time is "11 p.m.", and the importance is "middle" (mid). In the event data (423), the event name is "ev6", the transfer time is "now", and the importance is "high". Thus, the earliest time out of the respective transfer times of the pieces of event data (421, 422, and 423) stored in the queue (404) is "now". Thus, when the event data (423) has been stored in the queue (404), the server (302) combines the pieces of event data (421, 422, and 423) stored in the queue (404) into a single mail (452) and immediately sends (432) the single mail (452) to the team member (405). Moreover, out of the pieces of event data (421, 422, and 423), both of the respective importances of the pieces of event data (421 and 422) are "middle", and the importance of the event data (423) is "high". Thus, the respective descriptions of the pieces of event data (421, 422, and 423) may be combined in the mail (452) so that the description of the event data (423) is highlighted (for example, is displayed in large characters or in a color) relative to the descriptions of the pieces of event data (421 and 422). Alternatively, the description of the event data (423) may be directly shown in the single mail (452), and the descriptions of the pieces of event data (421 and 422) may not be directly shown in the mail (452), but links indicating respective places where the descriptions of the pieces of event data (421 and 422) are stored may be set. The team member (405) receives only the single mail (452), instead of receiving three mails corresponding to the pieces of event data (421, 422, and 423). Moreover, since the description of the event data (423) is highlighted in the single mail (452), the team member (405) can readily recognize the description of the important event data (423), out of the pieces of event data (421, 422, and 423). Thus, the load of checking mails by the team member (405) is reduced, and the risk of missing the description of the important event data (423) is reduced. Moreover, the communication cost of the communication path from the server (302) to the team member (405) is reduced.

FIG. 5 illustrates a situation in which, according to an embodiment of the present invention, in each queue prepared in a server, when the earliest time out of transfer times set for the queue has come, all notifications stored in the queue are sent to a team member as a single notification.

The embodiment in FIG. 5 is different from the embodiment in FIG. 4 in that a timer is provided in each queue.

A queue (503) and a queue (504) are prepared in the memory of the server (302). The queue (503) is associated at least with one of first change management information (for example, a first work item) and a team member who is at least one recipient (for example, a team member (505)). The queue (504) is associated with one of second change management information (for example, a second work item) and a team member (for example, the team member (505)) who is at least one recipient.

In the queue (503), pieces of event data (511, 512, and 513) are queued. When the pieces of event data (511, 512, and 513) arrive in the queue (503) in sequence, the server (302) compares the date and time of a timer (506) indicating a transfer time associated with the queue (503) with the transfer time of the event data having arrived, and updates the date and time of the timer (506) of the queue with any earlier date and time. Similarly, when pieces of event data (521, 522, and 523) arrive in the queue (504) in sequence, the server (302) compares the date and time of a timer (507) indicating a transfer time associated with the queue (504) with the transfer time of the event data having arrived, and updates the date and time of the timer (507) of the queue with any earlier date and time.

It is assumed that the event data (511) is event data having first been queued in the queue (503). In the queue (503), after the transfer time (10 a.m.) of the event data (511) is set to the timer (506) of the queue (503), no event data with a transfer time earlier than the set transfer time is queued. Thus, the transfer time of the timer (506) is not updated. Accordingly, when "10 a.m." that is the transfer time set in the timer (506) has come, the server (302) combines the pieces of event data (511, 512, and 513) stored in the queue (503) at that time into a single mail (551) and sends (531) the single mail (551) to the team member (505).

It is assumed that the event data (521) is event data having first been queued in the queue (504). In the queue (504), after the transfer time (10 p.m.) of the event data (521) is set to the timer (507) of the queue (504), the event data (522) with a transfer time (11 p.m.) later than the set transfer time is queued. Thus, the transfer time of the timer (507) is not updated from "10 p.m.". Then, the event data (523) is queued. The transfer time of the event data (523) is "now". Thus, since the current time is earlier than 10 p.m., the transfer time of the timer (507) is updated from "10 p.m." to "now". Since the transfer time of the timer (507) is "now", when the event data (523) has been queued in the queue (504), the server (302) combines the pieces of event data (521, 522, and 523) stored in the queue (504) into a single mail (552) and immediately sends (532) the single mail (552) to the team member (505).

FIGS. 6A to 6F are illustrations describing a case where, according to an embodiment of the present invention, in a queue provided in a server, the transfer time is not updated by subsequent event data.

Referring first to FIG. 6A, user A (601) activates terminal software of an application involving occurrence of events, for example Rational Team Concert™ (hereinafter called RTC). (Rational Team Concert is a trademark of International Business Machines Corporation in the United States, other countries, or both.) Then, the user A (601) selects a work item (shown in FIG. 6A as task no. 26) to cause a user screen (611) corresponding to the work item to appear. A record "priority" just after the user screen (611) appears is "no assignment" (621).

Referring now to FIG. 6B, it is assumed that the user A (601) has changed "priority" from "no assignment" (621) to "middle" (622) and saved "priority" via the user screen (611) at 2010-11-19 20:35:05. (See "updating time" at 661.) In response to the saving operation, a computer of the user A (601) sends a message corresponding to this edit operation to a server (602) (for example, an RTC server). The server (602) receives the message from the computer of the user A (601). The server (602) creates corresponding event data (641) on the basis of the received message. A data structure (661) of the event data (641) is as illustrated in, for example, FIG. 6B. The data structure (661) of the event data (641) includes updating information and post-updating information of a work item. Updating information may be the name of an attribute updated by a user and attribute values before and after the updating. In the case of the event data (641), the updating information states that the priority has been changed from "no assignment" to "middle". Moreover, in general, post-updating information may include pairs of names and values (also called attribute values) of all attributes of all work items after updating. In the case of the event data (641), the post-updating information is the updating time for the work item, a work item ID, a team area, an owner (also being one of the subscribers), and a priority. When no queue corresponding to the work item ID in the event data (641) exists, the server (602) prepares queues corresponding to the number of recipients in a memory. In FIG. 6B, a queue (631) for a user B (user_b) is prepared in the server (602). A recipient may be specified or added by the user A (601) via, for example, the screen (611).

Referring now to FIG. 6C, the server (602) adds profile information to the data structure (661) of the event data (641) referring to one or both of a user profile (671) and a project profile (672) stored in a storage unit in the server (602). A data structure (662) of the event data (641) to which the profile information is added includes, as the profile information, the time of transferring the event data to a recipient and, optionally, the importance of the event data.

The profile information is added to the event data (641) in a manner described below. The server (602) refers to the profile (671 or 672) to find a condition, from conditional expressions in the profile, that the event data (641) matches. The profile may include one or both of the user profile (671) and the project profile (672). Whether one or both of the profiles are used may be specified by, for example, each recipient. In FIG. 6C, owner "user_b" in the event data (641) matches a conditional expression P2 in the project profile (672). See "OWNER=user_b" in expression P2 of the project profile (672). Thus, the server (602) generates the data structure (662) by adding as the profile information, to the data structure (661) of the event data (641), transfer time "every hour" (the base time is set to be zero minutes past every hour) and, optionally, importance "middle", where this transfer time and importance are defined in the conditional expression P2.

Figure 6D:
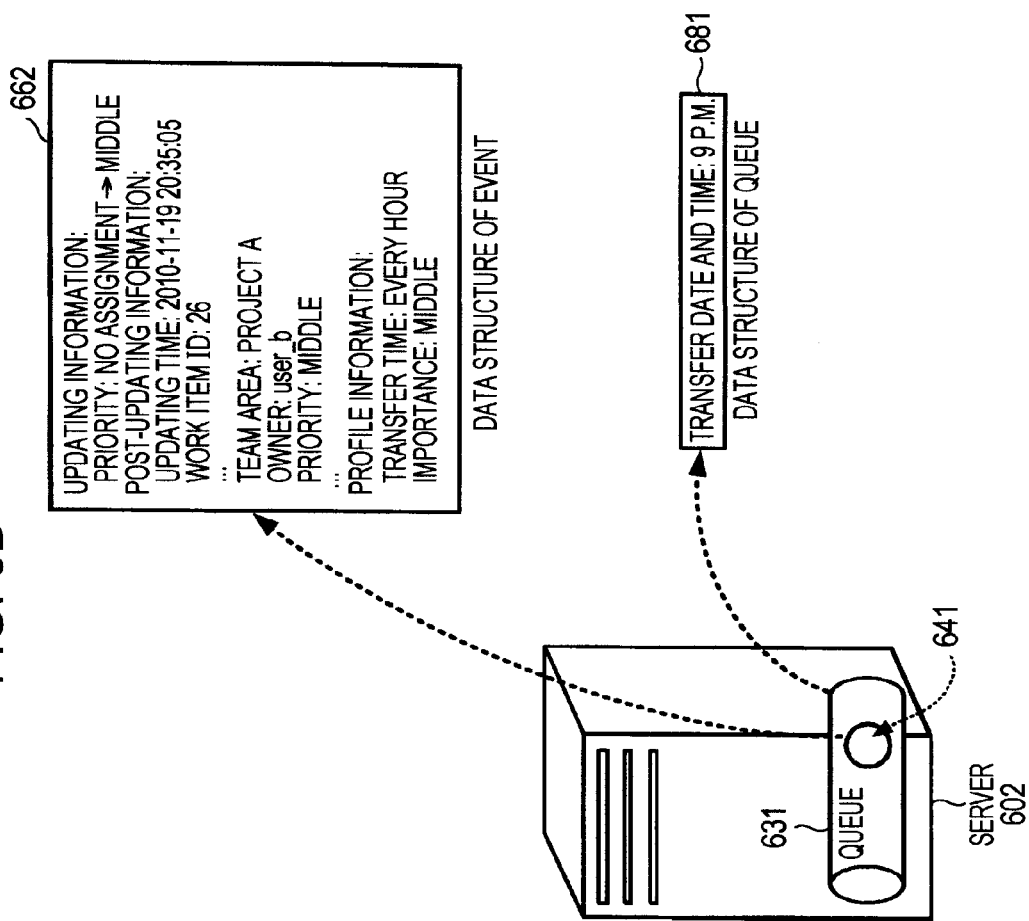

Referring now to FIG. 6D, the server (602) refers to the profile information in the data structure (662) of the event data (641) and compares the transfer time in the profile information of the data structure (662) with a transfer time set in a timer of the queue (631). When no transfer time is set in the timer of the queue (631), the server (602) sets the transfer time, which is the profile information of the event data (641), to be the transfer time of the timer. On the other hand, when a transfer time has been already set in the timer of the queue (631), the server (602) compares the transfer time in the event data (641) with the transfer time of the timer. Then, when the transfer time in the event data (641) comes earlier than the transfer time of the timer, the server (602) updates the transfer time of the timer with the transfer time in the event data (641), and when the transfer time in the event data (641) does not come earlier than the transfer time of the timer, the server (602) does not update the transfer time of the timer. Upon completing the aforementioned comparison of transfer times, the server (602) stores the event data (641) in the queue (631). In FIG. 6D, in the data structure (662) of the event data (641), the updating time is 2010-11-19 20:35:05, and the transfer time is every hour. Moreover, the timer of the queue (631) is in the initial state, i.e., no transfer time is set. Thus, the server (602) sets the transfer time in the updated event data (641) in the timer of the queue (631). Accordingly, a data structure (681) of the timer of the queue (631) indicates that the transfer date and time is "9 p.m." just after the update notification from 20:35:05 (i.e., 8:35:05 p.m.) is received.

Referring now to FIG. 6E, it is assumed that the user A (601) has repeated operations of editing and saving each record via the user screen (611) from 2010-11-19 20:40 to 20:55. It is assumed that, as a result, event data (642) and event data (643) have been queued in the server (602) in sequence. For the example, the event data (642) is event data generated in response to an event in which characters "Proceed as usual." (623) are added to a record "description" in the user screen (611), and the event data (643) is event data generated in response to an event in which data "2 days" (624) is entered for "estimation" in the user screen (611).

Owner "user_b" in the event data (642) matches the conditional expression P2 in the project profile (672 in FIG. 6C), in the example. Thus, the server (602) updates the data structure of the event data (642) with a data structure (663) by adding as the profile information, to the data structure of the event data (642), transfer time "every hour" (the base time is set to be zero minutes past every hour) and, optionally, importance "middle", where this transfer time and importance are defined in the conditional expression P2 (672).

Similarly, owner "user_b" in the event data (643) matches the conditional expression P2 in the project profile (672). Thus, the server (602) updates the data structure of the event data (643) with a data structure (664) by adding as the profile information, to the data structure of the event data (643), transfer time "every hour" (the base time is set to be zero minutes past every hour) and, optionally, importance "middle" defined in the conditional expression P2.

When the event data (642) has been queued in the queue (631), the server (602) refers to the profile information in the data structure (663) of the event data (642). Since the transfer time in the profile information of the data structure (663) is "every hour", the transfer time of the event data (642) is 9 p.m. just after the time (from 2010-11-19 20:40 to 20:55) when the event corresponding to the event data (642) occurred. Since transfer time "9 p.m." set in the queue (631) is the same as transfer time "9 p.m." of the event data (642), the server (602) does not update the transfer time set for the queue (631). Thus, the transfer time set for the queue (631) remains "9 p.m.".

Then, when the event data (643) has been queued in the queue (631), the server (602) refers to the profile information in the data structure (664) of the event data (643). Since the transfer time in the profile information of the data structure (664) is "every hour", the transfer time of the event data (643) is 9 p.m. Since transfer time "9 p.m." set in the queue (631) is the same as transfer time "9 p.m." of the event data (643), the server (602) does not update the transfer time set for the queue (631). Thus, the transfer time set for the queue (631) remains "9 p.m.".

Referring now to FIG. 6F, the server (602) compares transfer time "2010-11-19 9 p.m." set for the queue (631) with the current time. When the transfer time has come, the server (602) combines all the pieces of event data (641, 642, and 643) in the queue (631) into a single notification and sends (690) the single notification (for example, a mail) to a computer of the user B (603) (user_b). In the content of the single notification, for example, the summary mail may comprise listing only the pieces of updating information from the pieces of event data (641, 642, and 643), as shown (691) in FIG. 6F.

FIGS. 7A to 7E are illustrations describing a case where, according to an embodiment of the present invention, in a queue provided in a server, the transfer time is updated by subsequent event data.

Figure 7A:
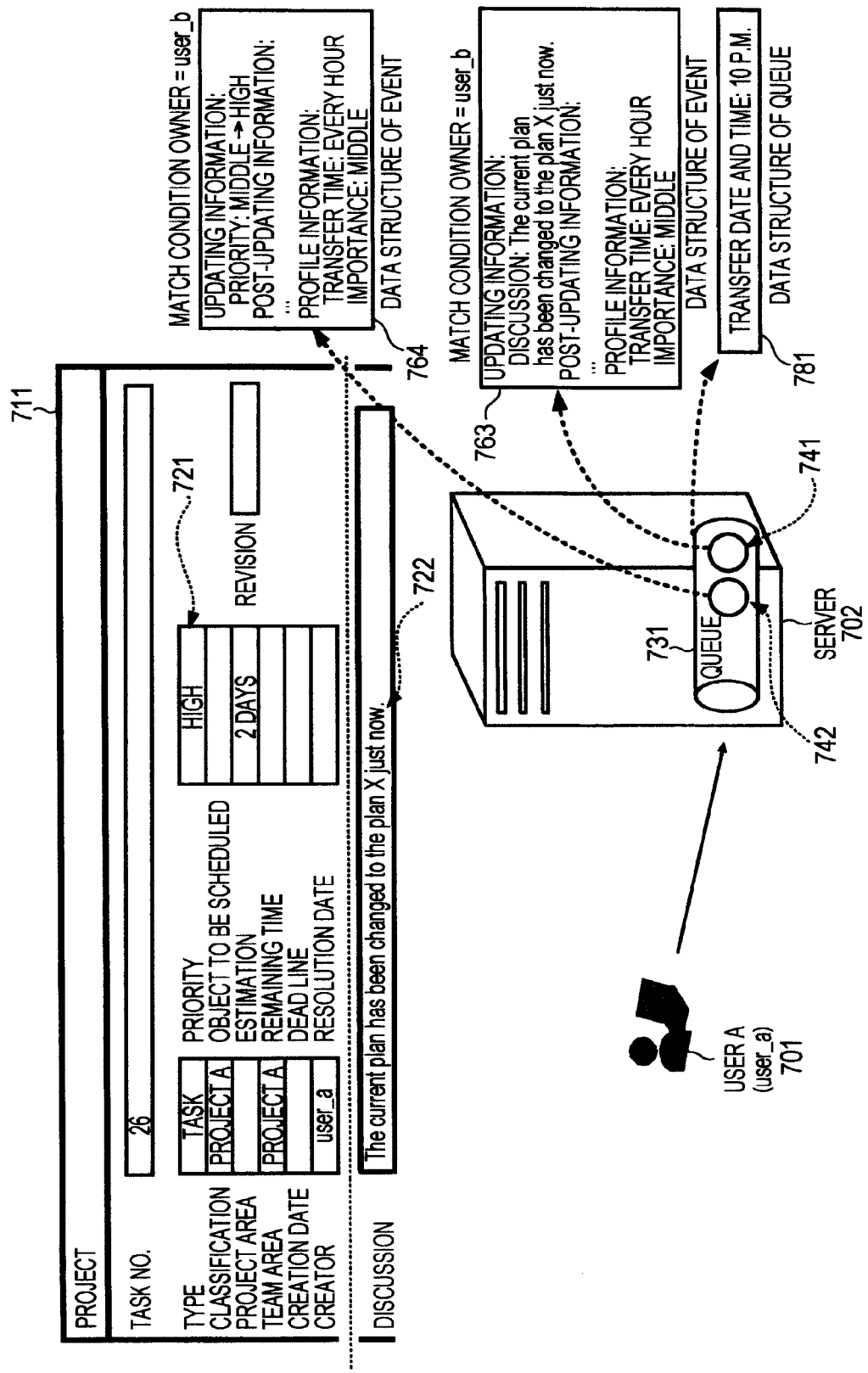

Referring now to FIG. 7A, it is assumed that a user A (701) has repeated operations of editing and saving each record via a user screen (711) from 2010-11-19 21:00 to 21:55. It is assumed that, as a result, event data (741) and event data (742) have been queued in a server (702) in sequence. The event data (741) is event data generated in response to an event in which characters "The current plan has been changed to the plan X just now." (722) are added to a record "discussion" in the user screen (711). The event data (742) is event data generated in response to an event in which "priority" in the user screen (711) is changed from "middle" to "high" (721).

Owner "user_b" in the event data (741) matches, in the example, a conditional expression P2 in a project profile (772 in FIG. 7C described below). Thus, the server (702) updates the data structure of the event data (741) with a data structure (763) by adding as the profile information, to the data structure of the event data (741), transfer time "every hour" (the base time is set to be zero minutes past every hour) and, optionally, importance "middle", where this transfer time and importance are defined in the conditional expression P2 (772).

Similarly, owner "user_b" in the event data (742) matches the conditional expression P2 in the project profile (772). Thus, the server (702) updates the data structure of the event data (742) with a data structure (764) by adding as the profile information, to the data structure of the event data (742), transfer time "every hour" (the base time is set to be zero minutes past every hour) and, optionally, importance "middle" defined in the conditional expression P2.

When the event data (741) has been queued in a queue (731), the server (702) refers to the profile information in the data structure (763) of the event data (741). Since the transfer time in the profile information in the data structure (763) is "every hour", the transfer time of the event data (741) is "10 p.m." just after the time (from 2010-11-19 21:00 to 21:55— i.e., 9 p.m. to 9:55 p.m.) when the event corresponding to the event data (741) occurred. When no transfer time is set in a timer of the queue (731), the server (702) sets transfer time "10 p.m." of the updated event data (741) to be the transfer time of the timer.

Then, when the event data (742) has been queued in the queue (731), the server (702) refers to the profile information in the data structure (764) of the event data (742). Since the transfer time in the profile information is "every hour", the transfer time of the event data (742) is 10 p.m. just after the time (from 2010-11-19 21:00 to 21:55) when the event corresponding to the event data (742) occurred. Since transfer time "10 p.m." set in the queue (731) is the same as transfer time "10 p.m." of the event data (742), the server (702) does not update the transfer time set for the queue (731). That is, the transfer time set for the queue (731) remains "10 p.m.".

Referring now to FIG. 7B, it is assumed that the user A (701) has edited "deadline" into "2010-11-19" (which is today, in the example) (723) and saved "deadline" via the user screen (711) at 2010-11-19 21:32:44. (See "updating time" at 765.) In response to the saving operation, a computer of the user A (701) sends a message corresponding to this edit operation to the server (702). The server (702) receives the message from the computer of the user A (701). The server (702) creates corresponding event data (743) on the basis of the received message. A data structure (765) of the event data (743) is as illustrated in, for example, FIG. 7B. The data structure (765) of the event data (743) includes updating information and post-updating information of a work item. In the case of the data structure (765), the updating states that the deadline has been changed from "none" to "2010-11-19". When no queue corresponding to a work item ID in the data structure (765) exists, the server (702) prepares queues corresponding to the number of recipients in a memory. In FIG. 7B, the queue (731) for a user B (user_b) is prepared in the server (702). A recipient may be specified or added by the user A (701) via, for example, the screen (711).

Referring now to FIG. 7C, the server (702) adds profile information to the data structure (765) of the event data (743) referring to one or both of a user profile (771) and the project profile (772) stored in a storage unit in the server (702). A data structure (766) of the event data (743) to which the profile information is added includes, as the profile information, the transfer time and, optionally, importance of the event data.

The profile information is added to the event data (743) in a manner described below. The server (702) refers to the profile, from conditional expressions in the profile, to find a condition that the event data (743) matches. The profile may include one or both of the user profile (771) and the project profile (772). Whether one or both of the profiles are used may be specified by, for example, each recipient. In FIG. 7C, deadline "2011-11-19" in the event data (743) matches a conditional expression P1 "deadline=today" in the project profile (772), where condition P1 checks for deadlines that are close. Thus, the server (702) generates the data structure (766) by adding as the profile information, to the data structure (765) of the event data (743), transfer time "now" and importance "high" defined in the conditional expression P1.

Referring now to FIG. 7D, the server (702) refers to the profile information in the data structure (766) of the event data (743) and compares the transfer time in the profile information in the data structure (766) with the transfer time set in the timer of the queue (731). In FIG. 7D, the transfer time in the data structure (766) of the event data (743) is "now". On the other hand, the transfer time in the timer of the queue (731) is "10 p.m.". See 781. Thus, the server (702) updates the transfer time in the timer of the queue (731) with transfer time "now" in the data structure (766) of the event data (743). Accordingly, the server (702) updates a data structure (781) of the timer of the queue (731) with transfer date and time "2010-11-19 21:32:44" to reflect, in this example, that the transfer time is now (782).

Referring now to FIG. 7E, when the current time is equal to (or is past) the transfer time "now" (which is 2010-11-19 21:32:44, in the example) set for the queue (731), the server (702) combines all the pieces of event data (741, 742, and 743) in the queue (731) into a single notification (790) and sends the single notification (790) to a computer of the user B (703) (user_b). In the profile information in the data structure (766) of the event data (743), the importance of the event data (743) is "high". On the other hand, in the pieces of profile information in the respective data structures (763 and 764) of the event data (741) and the event data (742), the importance of each of the pieces of event data (741 and 742) is "middle". Thus, the description of the event data (743) within the content of the single notification (790) may be highlighted relative to the respective descriptions of the pieces of event data (741 and 742) (791). In the example, this highlighting comprises using a larger size for the "deadline" content of the event data (743). Alternatively, since the importance of the event data (741) is "middle", the content of the single notification (790) may include, for example, links (such as a Uniform Resource Locator, or URL, as shown at 792) indicating places in the server (702) where the descriptions of the event data (741) and, as necessary, the event data (742) are stored (792).

Figure 8:
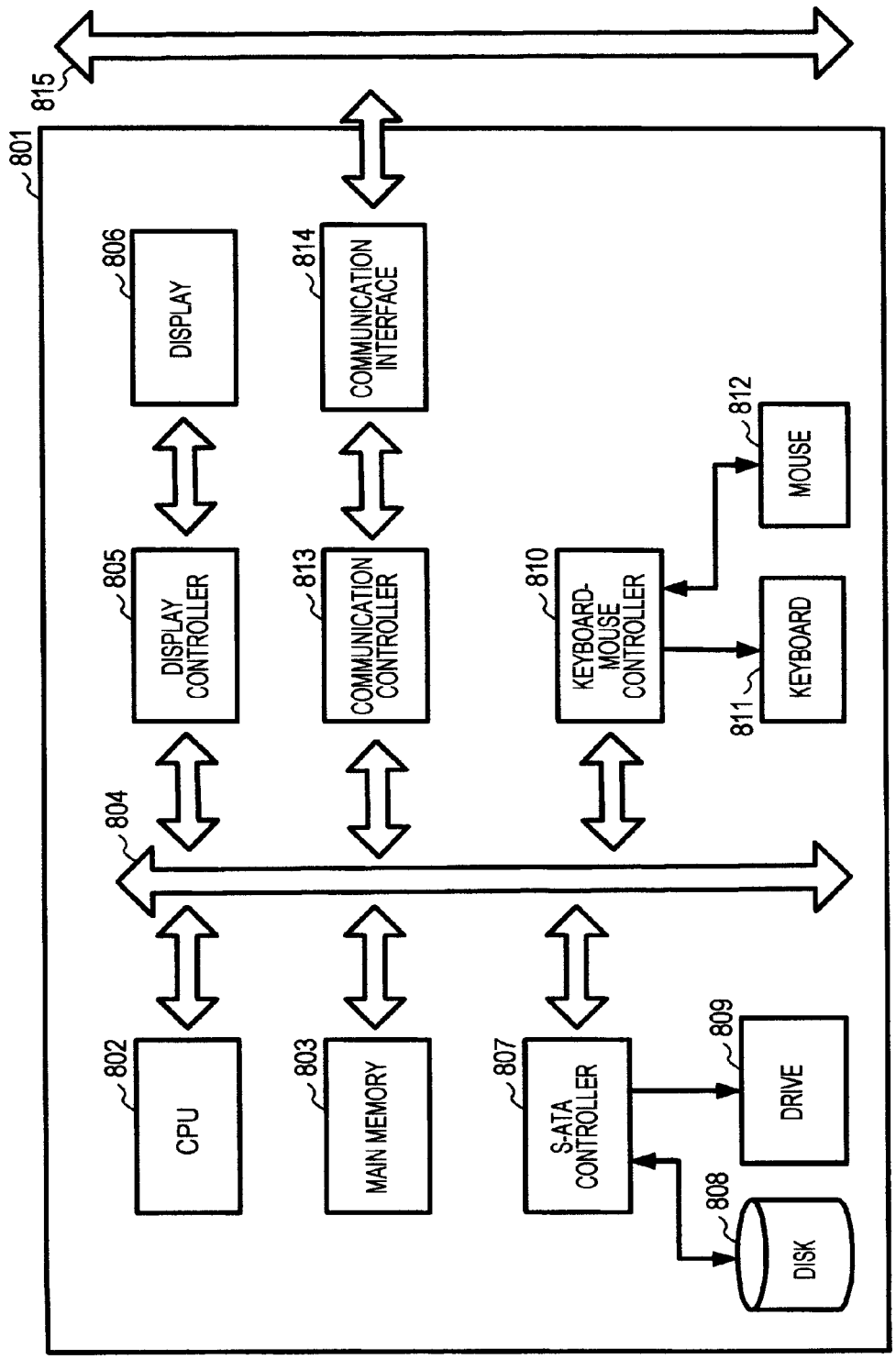
FIG. 8 is a basic block diagram of computer hardware that may be used in an embodiment of the present invention.

FIG. 8 is a basic block diagram of computer hardware that may be used in an embodiment of the present invention.

A computer (801) includes a CPU (802) and a main memory (803) connected to a bus (804). The CPU (802) is preferably based on a 32-bit or 64-bit architecture. For example, the Core i™ series, the Core 2™ series, the Atom™ series, the Xeon™ series, the Pentium® series, or the Celeron® series of Intel Corporation or the Phenom™ series, the Athlon™ series, the Turion™ series, or Sempron™ of Advanced Micro Devices, Inc. may be used as the CPU (802).

("Core i", "Core 2", "Atom", and "Xeon" are trademarks, and "Pentium" and "Celeron" are registered trademarks, of Intel Corporation in the United States, other countries, or both. "Phenom", "Athlon", "Turion", and "Sempron" are trademarks of Advanced Micro Devices, Inc. in the United States, other countries, or both.) A display (806) such as a liquid crystal display (LCD) may be connected to the bus (804) via a display controller (805). The display (806) is used to display, for management of computers, information on a computer connected to a network via a communication line and information on software running on the computer using an appropriate graphics interface. A disk (808) such as a hard disk or silicon disk and a drive (809) such as a CD, DVD, or BD (Blu-ray disk) drive may be connected to the bus (804) via an SATA or IDE controller (807). Moreover, a keyboard (811) and a mouse (812) may be connected to the bus (804) via a keyboard-mouse controller (810) or USB bus (not shown).

An operating system, programs providing a Java® processing environment, Java® applications, a Java® virtual machine (VM), and a Java® just-in-time (JIT) compiler, such as J2EE®, other programs, and data are stored in the disk (808) to be loadable to the main memory. ("Java" and "J2EE" are registered trademarks of Oracle America, Inc. in the United States, other countries, or both.)

The drive (809) is used to install a program from a CD-ROM, DVD-ROM, or BD to the disk (808) as necessary.

A communication interface (814) is based on, for example, the Ethernet protocol. The communication interface (814) is connected to the bus (804) via a communication controller (813), physically connects the computer (801) to a communication line (815), and provides a network interface layer to the TCP/IP communication protocol of a communication function of the operating system of the computer (801). In this case, the communication line (815) may be a wired LAN environment or a wireless LAN environment based on wireless LAN connectivity standards, for example IEEE 802.11a/b/g/n.

Figure 9:
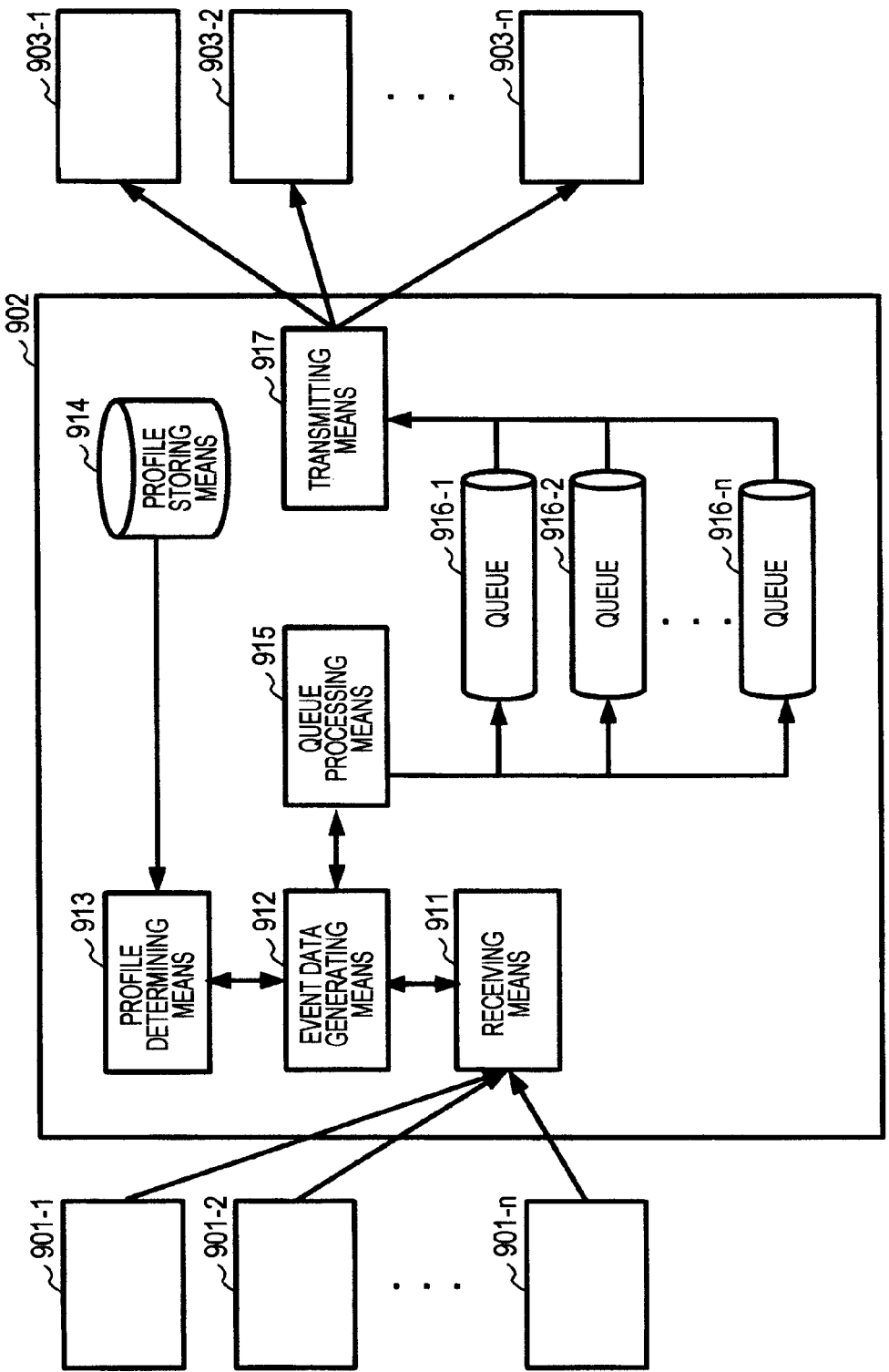
FIG. 9 illustrates a functional block diagram of a server and clients according to an embodiment of the present invention, including the functions of the computer hardware shown in FIG. 8 and a network environment including the server and the clients.

FIG. 9 illustrates a functional block diagram of a server (902) and clients (901-1 to 901-n and 903-1 to 903-n) according to an embodiment of the present invention, including the hardware functions of the computer (801) shown in FIG. 8 and a network environment of the server (902) and the clients (901-1 to 901-n and 903-1 to 903-n).

The server (902) is not limited to a specific server as long as the server includes a function of receiving an event from an application involving occurrence of events and sending a notification to a recipient. The server (902) may be a server of, for example, a change management system, a task management system, a project management system, a quality control system, a bug management system, a fault management system, or a track management system. The aforementioned application includes, for example, Rational Team Concert and Rational ClearQuest™ products, Team Foundation Server™ product, and Bugzilla, Trac, and Kagemai as open source components. ("Rational ClearQuest" is a trademark of International Business Machines Corporation in the United States, other countries, or both. "Team Foundation Server" is a trademark of Microsoft Corporation in the United States, other countries, or both.) Moreover, the clients (901-1 to 901-n and 903-1 to 903-n) may be clients in a change management system, a task management system, a project management system, a quality control system, a bug management system, a fault management system, or a track management system described above.

The server (902) may include, in addition to, for example, the CPU (802), the main memory (803), and the disk (808) shown in FIG. 8, receiving means (911), event data generating means (912), profile determining means (913), profile storing means (914), queue processing means (915), and transmitting means (917). Moreover, when the server (902) has received a message corresponding to event data from any of the clients (901-1 to 901-n or 903-1) and when no queue for change management information corresponding to the event exists, one or more queues (916-1 to 916-n) for the change management information corresponding to the event are prepared in the main memory (803) of the server (902). Thus, in the server (902), the queues (916-1 to 916-n) may be dynamically created in the memory.

The receiving means (911) receives a notification (for example, a message) sent in response to occurrence of an event from at least one of the clients (901-1 to 901-n) and stores the notification in, for example, a buffer in the memory. One notification corresponding to one event is created by a client. The notification may include, for example, a value of an attribute (hereinafter also called an attribute value) of a record changed or entered by a user. The notification may be made by sending, for example, a mail, a message, or metadata.

The receiving means (911) transfers the notification to the event data generating means (912) so as to generate event data from the notification.

The event data generating means (912) generates event data on the basis of the notification. The event data includes, for example, updating information and post-updating information. The updating information may include, for example, the name of an attribute changed by a user of a client (901-1 to 901-n) in the event and attribute values before and after updating. The post-updating information retains information, except the updating information, to be used to perform matching on conditional expressions in a profile and may include pairs of names and values of all attributes of all work items after updating. In this case, in performing matching on conditional expressions in a profile, in condition matching of attributes associated with the updating information, a part of the updating information having been updated may be referred to. The post-updating information may include, for example, the updating time of an attribute value (also being the occurrence time of an event), the identifier of change management information, a team area, an owner (also being one of the subscribers), and a priority. Change management information is also called a changing request. Change management information is, for example, a work item.

The event data generating means (912) further transfers the event data to the profile determining means (913) so as to add profile information to the event data.

The profile determining means (913) receives the event data from the event data generating means (912). Then, the profile determining means (913) determines whether the event data from the event data generating means (912) matches any of the conditional expressions in a profile associated with the event of the event data. When the event data matches any of the conditional expressions, the profile determining means (913) transfers, as profile information, a transfer time (a time to transfer event data to a recipient) and, optionally, importance (the importance of event data) set in the matching conditional expression to the event data generating means (912). Upon receiving the profile information (including, for example, the transfer time, the importance, or the combination of them), the event data generating means (912) adds the received profile information to the event data. In this case, the event data generating means (912) may also include the functions of the profile determining means (913).

The profile storing means (914) stores profiles to be used in the profile determining means (913). A profile may include, for example, one or both of a user profile and a project file. A profile is prepared for each recipient. Thus, for example, for a user B, a user profile and a project profile for the user B are prepared. Preparing a profile for each recipient allows the transfer time and the importance to vary with each recipient. In this case, recipients may be grouped into a team, and the name of the team may be handled as a single user.

A user profile may include at least one conditional expression associated with an electronic calendar and a transfer time associated with the conditional expression. An electronic calendar may be stored in, for example, the server (902) and be, for example, Lotus Notes® Calendar of Lotus Notes that is exemplary scheduling management software. (Lotus Notes is a registered trademark of International Business Machines Corporation in the United States, other countries, or both.) A conditional expression is, for example, early morning, a.m., p.m., nighttime, conference, business trip, or vacation. For example, a time frame corresponding to each conditional expression is registered in advance by default or a recipient. A transfer time is, for example, the completion time of each conditional expression. For example, a transfer time corresponding to each conditional expression is registered in advance by default or a recipient.

A project profile may include at least one conditional expression associated with a project, a transfer time associated with the conditional expression, and, optionally, importance associated with the conditional expression. A conditional expression is, for example, a team area name, a work item ID, or pairs of attributes and attribute values of change management information. For example, a period or time frame corresponding to each conditional expression is registered in advance by default or a recipient. A transfer time is, for example, the completion time of each conditional expression. For example, a transfer time corresponding to each conditional expression is registered in advance by default or a recipient. Importance is a measure for determining how the respective descriptions of pieces of event data are combined into a single notification in a manner that depends on importance. Importance may be set in, for example, three stages "high", "middle", and "low".

Alternatively, a project profile may include at least one conditional expression associated with an electronic calendar, a transfer time associated with the conditional expression, and importance associated with the conditional expression. A conditional expression is, for example, development stage, test stage, or production stage. For example, a period or time frame corresponding to each conditional expression is registered in advance by default or a recipient. A conditional expression associated with an electronic calendar in a project profile is different from a conditional expression associated with an electronic calendar in a user profile in that a conditional expression associated with an electronic calendar in a project profile is a schedule related to a job. In this case, a conditional expression associated with an electronic calendar in a project profile and a conditional expression associated with an electronic calendar in a user profile may not be distinguished from each other strictly. A transfer time is, for example, the completion time of each conditional expression. For example, a transfer time corresponding to each conditional expression is registered in advance by default or a recipient.

When no queue for change management information (for example, a work item) corresponding to an event of event data exists, the queue processing means (915) prepares a queue in the memory. The queues (916-1 to 916-n) are used to temporarily queue event data. The queues (916-1 to 916-n) are associated with change management information corresponding to an event, a recipient of the change management information, or the combination of them. For example, a queue may be generated with keys representing the identifier of a work item and a recipient who is an attribute of the work item. Since a plurality of recipients may exist regarding the same identifier of a work item, the queue processing means (915) may generate a plurality of queues associated with the same identifier of a work item.

The queue processing means (915) manages queues by a queue set. In a case where no transfer time is set for a queue for storing event data, the queue processing means (915) sets a transfer time set in the event data in the queue. Moreover, in a case where a transfer time is set for a queue for storing event data, when a transfer time set in the event data is earlier than the transfer time set for the queue, the queue processing means (915) updates the transfer time set for the queue with the transfer time set in the event data.

When the transmitting means (917) has sent a notification as described above to any of the clients (901-1 to 901-n and 903-1 to 903-n), the queue processing means (915) may delete a vacant queue from the memory so as to save the memory cost.

When the earliest time out of transfer times set in respective event data notifications stored in a queue has come, the transmitting means (917) sends, as a single notification, all pieces of event data stored in the queue to at least one of the clients (903-1 to 903-n) that is a recipient. For example, at a transfer time set for a queue, the transmitting means (917) may send, as a single notification, all pieces of event data stored in the queue to at least one of the clients (903-1 to 903-n) that is a recipient associated with the queue. Alternatively, for example, when the earliest time out of transfer times set in respective pieces of event data stored in a queue has come, the transmitting means (917) may send, as a single notification, all the pieces of event data stored in the queue to at least one of the clients (903-1 to 903-n) that is a recipient associated with the queue.

The clients (901-1 to 901-n) may be connected to the server (902) via a network. An application involving occurrence of events can be implemented in the clients (901-1 to 901-n), and each of the clients (901-1 to 901-n) sends, in response to occurrence of an event, a notification corresponding to the event to the server (902). In this case, the clients (901-1 to 901-n) may also include the functions of the clients (903-1 to 903-n). In Agile Development, a user of each of the clients (901-1 to 901-n) may also be called, for example, a team leader or Scrum Master.

The clients (903-1 to 903-n) may be connected to the server (902) via a network. Each of the clients (903-1 to 903-n) may receive, from the server (902), a notification about event data sent by other clients (such as, for example, clients 901-1 to 901-n). In this case, the clients (903-1 to 903-n) may also include the functions of the clients (901-1 to 901-n). In Agile Development, a user of each of the clients (903-1 to 903-n) may also be called, for example, a team member or Scrum Member.

Figure 10:
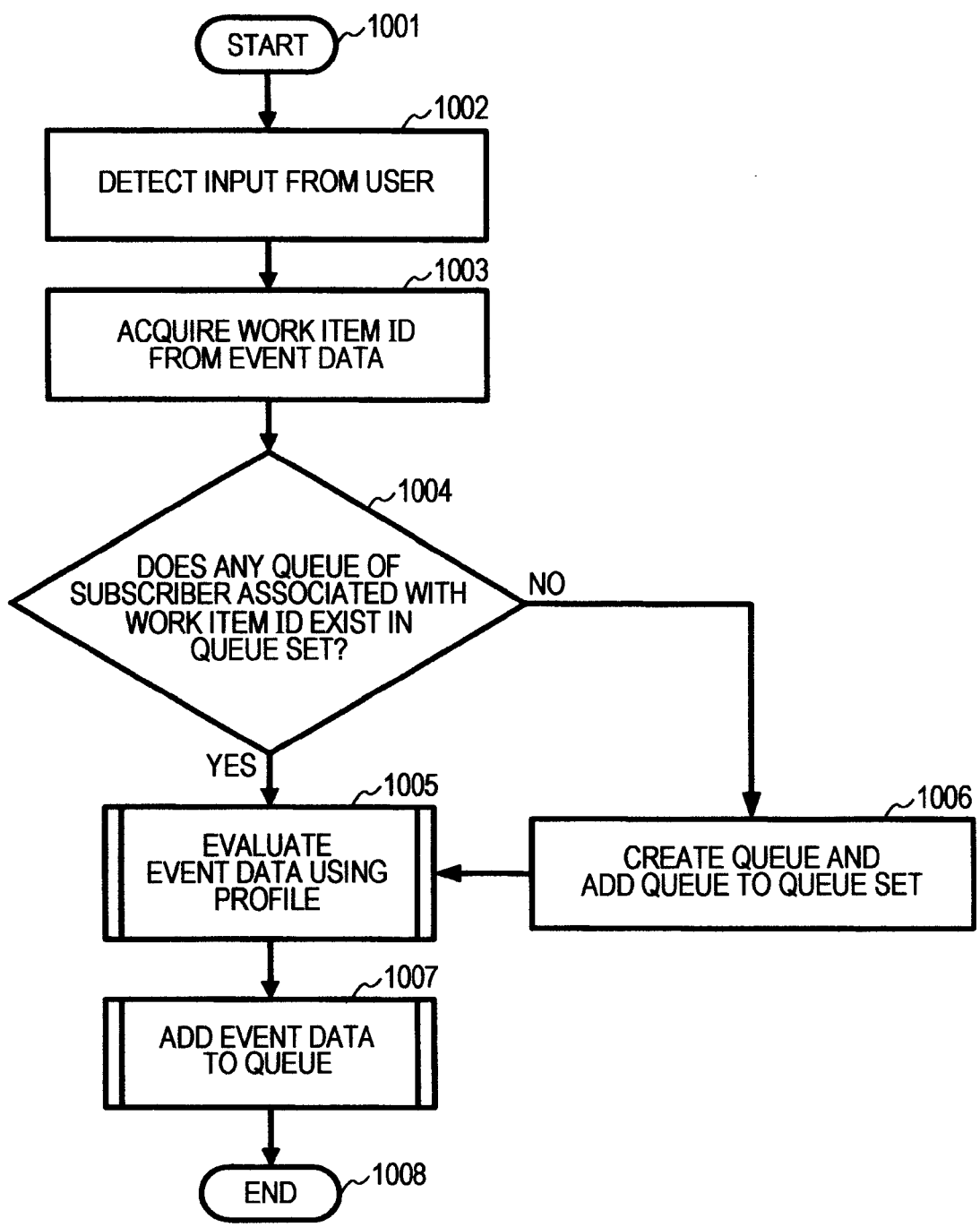
FIG. 10 illustrates a flowchart of a process according to an embodiment of the present invention of storing event data, including a notification of an event, in a queue prepared in a server.

FIG. 10 illustrates a flowchart of a process according to an embodiment of the present invention of storing event data, including a notification of an event, in a queue prepared in a server.

In step 1001, the server (902) starts the process of storing event data in a queue prepared in a server.

In step 1002, the receiving means (911) detects input from any of the clients (901-1 to 901-n). The input may be detected by the receiving means (911) receiving a notification corresponding to an event from any of the clients (901-1 to 901-n). The notification includes event information (for example, the name and value of an attribute of a record edited by a user). The receiving means (911) transfers the notification to the event data generating means (912).

In step 1003, the event data generating means (912) acquires a work item ID corresponding to the notification from a repository storing work item IDs corresponding to pieces of event information. Then, the event data generating means (912) creates event data corresponding to the notification by detecting a difference between a record that corresponds to the work item ID and is stored in the repository in the server (902) and the record having been changed in response to the notification.

In step 1004, the event data generating means (912) checks whether any queue of a recipient associated with the acquired work item ID exists in the queue set (916-1 to 916-n). When such a queue exists (i.e., a positive result at step 1004), the event data generating means (912) passes the control of the process to the profile determining means (913) to proceed to step 1005 (which is described in further detail with regard to FIGS. 12A and 12B). On the other hand, when such a queue does not exist, the event data generating means (912) passes the control of the process to the queue processing means (915) to proceed to step 1006 (which is described in further detail with regard to FIG. 13).

In step 1005, the profile determining means (913) evaluates the event data using a profile. That is, the profile determining means (913) determines whether the event data matches any conditional expression in a profile associated with the event of the event data. When a match is found, the profile determining means (913) transfers, to the event data generating means (912), a transfer time and, optionally, importance associated with the matching condition. Then, the event data generating means (912) updates the event data by adding the transfer time and, optionally, importance to the event data. The event data generating means (912) transfers the updated event data to the queue processing means (915).

In step 1006, the queue processing means (915) creates a queue for the recipient associated with the acquired work item ID. Then, the queue processing means (915) adds the created queue to the queue set. After adding the queue to the queue set, the queue processing means (915) passes the control of the process to the event data generating means (912) to proceed to step 1005.

In step 1007, the queue processing means (915) stores the event data in the queue corresponding to the event.

In step 1008, the server (902) terminates the process of storing event data in a queue.

Figure 11B:
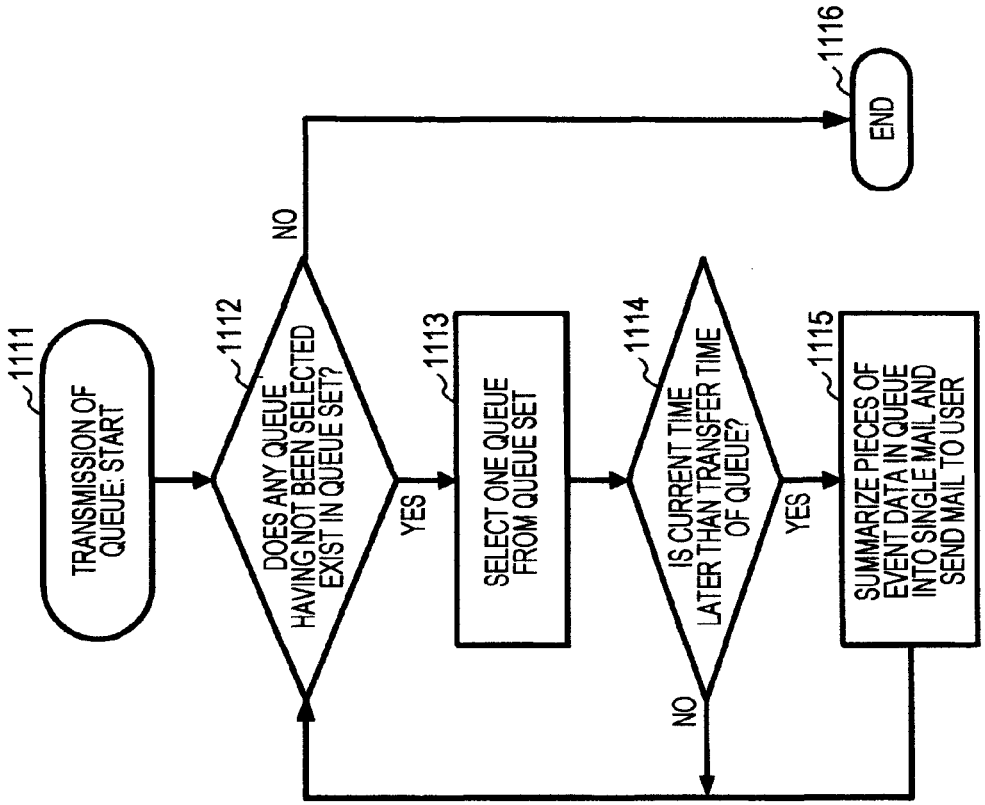
FIG. 11 (comprising FIGS. 11A and 11B) illustrates a flowchart of a process, according to an embodiment of the present invention, of sending pieces of event data in a queue to a recipient as a single notification.
Figure 11A:
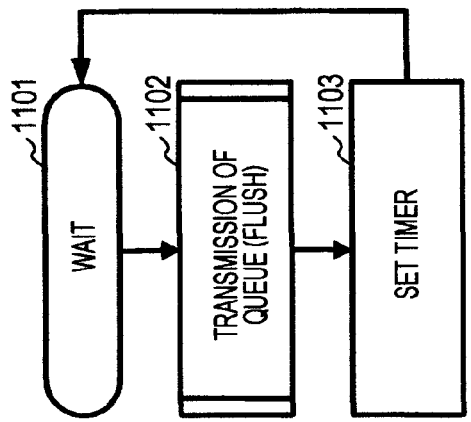

FIG. 11 (comprising FIGS. 11A and 11B) illustrates a flowchart of a process, according to an embodiment of the present invention, of sending pieces of event data in a queue to a recipient as a single notification.

FIG. 11A illustrates the overall flow of the process.

In step 1101, the transmitting means (917) waits until the earliest time of transfer times set in respective pieces of event data stored in a queue comes.

In step 1102, when the earliest time of the transfer times set in the pieces of event data stored in the queue has come, the transmitting means (917) combines the pieces of event data in the queue into a single notification and sends the single notification to a client that is a recipient associated with the queue. The details of step 1102 will be described in FIG. 11B.

In step 1103, upon sending the single notification, the transmitting means (917) sets a timer set for the queue in the initial state.

FIG. 11B illustrates a flow of step 1102 in FIG. 11A.

In step 1111, the transmitting means (917) starts a process of sending pieces of event data in a queue.

In step 1112, the transmitting means (917) checks whether any queue having not been selected exists in a queue set. When a queue having not been selected exists in the queue set, the transmitting means (917) causes the process to proceed to step 1113. On the other hand, when no queue having not been selected exists in the queue set, the transmitting means (917) causes the process to proceed to step 1116 (a terminating operation).

In step 1113, the transmitting means (917) selects a queue having not been selected from the queue set.

In step 1114, the transmitting means (917) determines whether the current time is later than a transfer time set for the queue selected in step 1113. When the current time is later than the transfer time set for the queue, the transmitting means (917) causes the process to proceed to step 1115. On the other hand, when the current time is not later than the transfer time set for the queue, the transmitting means (917) causes the process to return to step 1112.

In step 1115, when the earliest time of transfer times set in respective pieces of event data stored in the queue has come, the transmitting means (917) combines the pieces of event data in the queue into a single notification and sends the single notification to a client (recipient) associated with the queue. After sending the single notification, the transmitting means (917) causes the process to return to step 1112.

In step 1116, since no queue having not been selected exists, the transmitting means (917) terminates the process of sending pieces of event data in a queue.

Figure 12A:
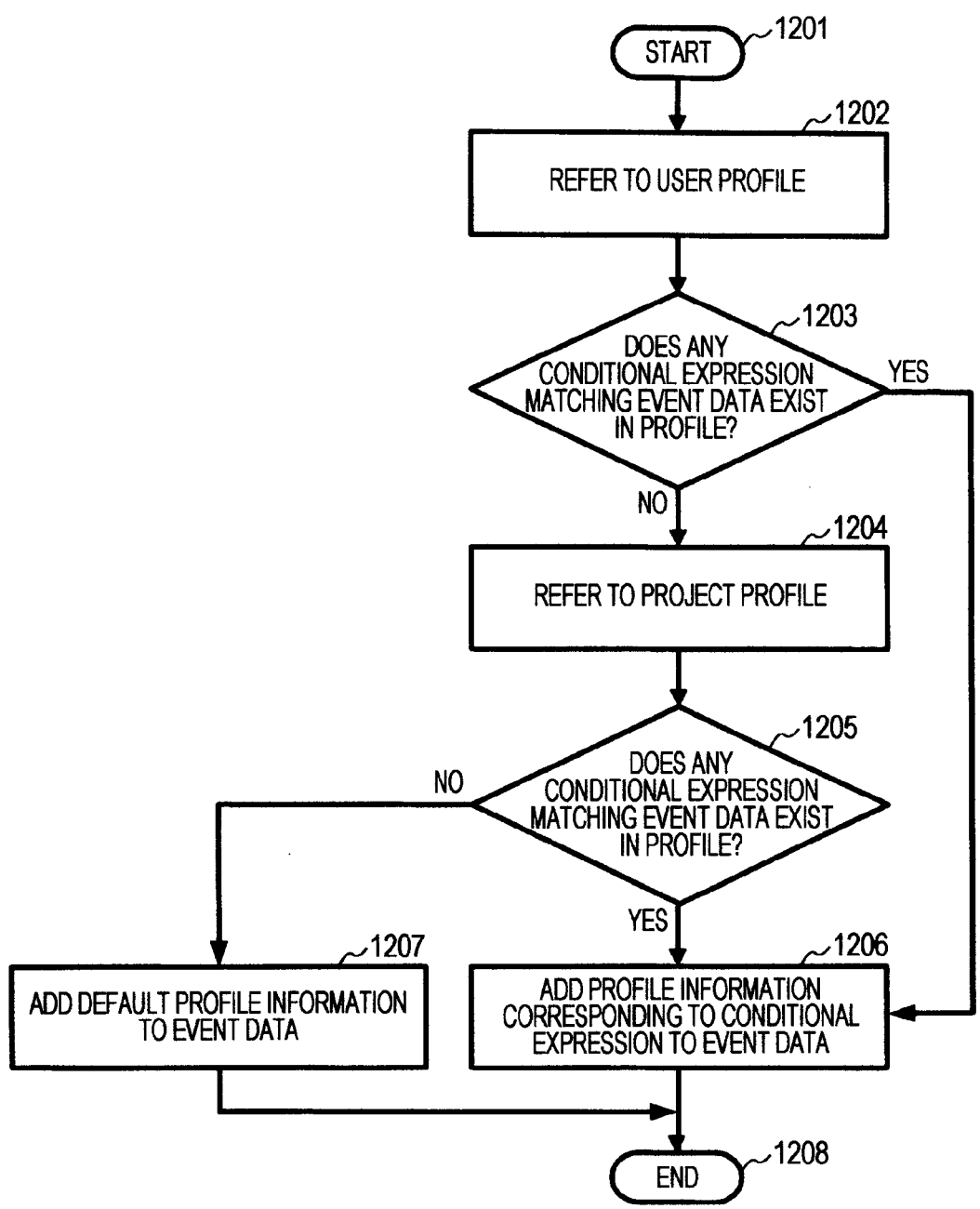
FIGS. 12A and 12B illustrate flowcharts of a process, according to an embodiment of the present invention, of evaluating event data using a profile.

FIG. 12A illustrates a flowchart of a process of evaluating event data using a profile, and provides further detail for step 1005 of FIG. 10.

In step 1201, the profile determining means (913) starts the process of evaluating event data using a profile.

In step 1202, the profile determining means (913) receives event data from the event data generating means (912). Then, in order to determine whether the event data matches any conditional expression in a user profile associated with the event of the event data, the profile determining means (913) further retrieves the user profile from the profile storing means (914) and refers to the user profile.

In step 1203, the profile determining means (913) determines whether any conditional expression matching the event data exists in the retrieved user profile. When a matching conditional expression exists in the user profile, the profile determining means (913) causes the process to proceed to step 1206. On the other hand, when no matching conditional expression exists in the user profile, the profile determining means (913) causes the process to proceed to step 1204 so as refer to another profile.

In step 1204, in order to determine whether the event data matches any conditional expression in a project profile associated with the event of the event data, the profile determining means (913) retrieves the project profile from the profile storing means (914) and refers to the project profile.

In step 1205, the profile determining means (913) determines whether any conditional expression matching the event data exists in the retrieved project profile. When a matching conditional expression exists in the project profile, the profile determining means (913) causes the process to proceed to step 1206. On the other hand, when no matching conditional expression exists in the project profile, the profile determining means (913) causes the process to proceed to step 1207.

In step 1206, the profile determining means (913) adds profile information (a transfer time and, optionally, importance) corresponding to the matching conditional expression to the event data.

In step 1207, since no matching conditional expression exists in the project profile, the profile determining means (913) adds default profile information to the event data. Default profile information may be appropriately set by persons skilled in the art. Default profile information includes, for example, "8 o'clock every morning" as the transfer time and "low" as the importance.

In step 1208, the profile determining means (913) terminates the process of evaluating event data using a profile.

Figure 12B:
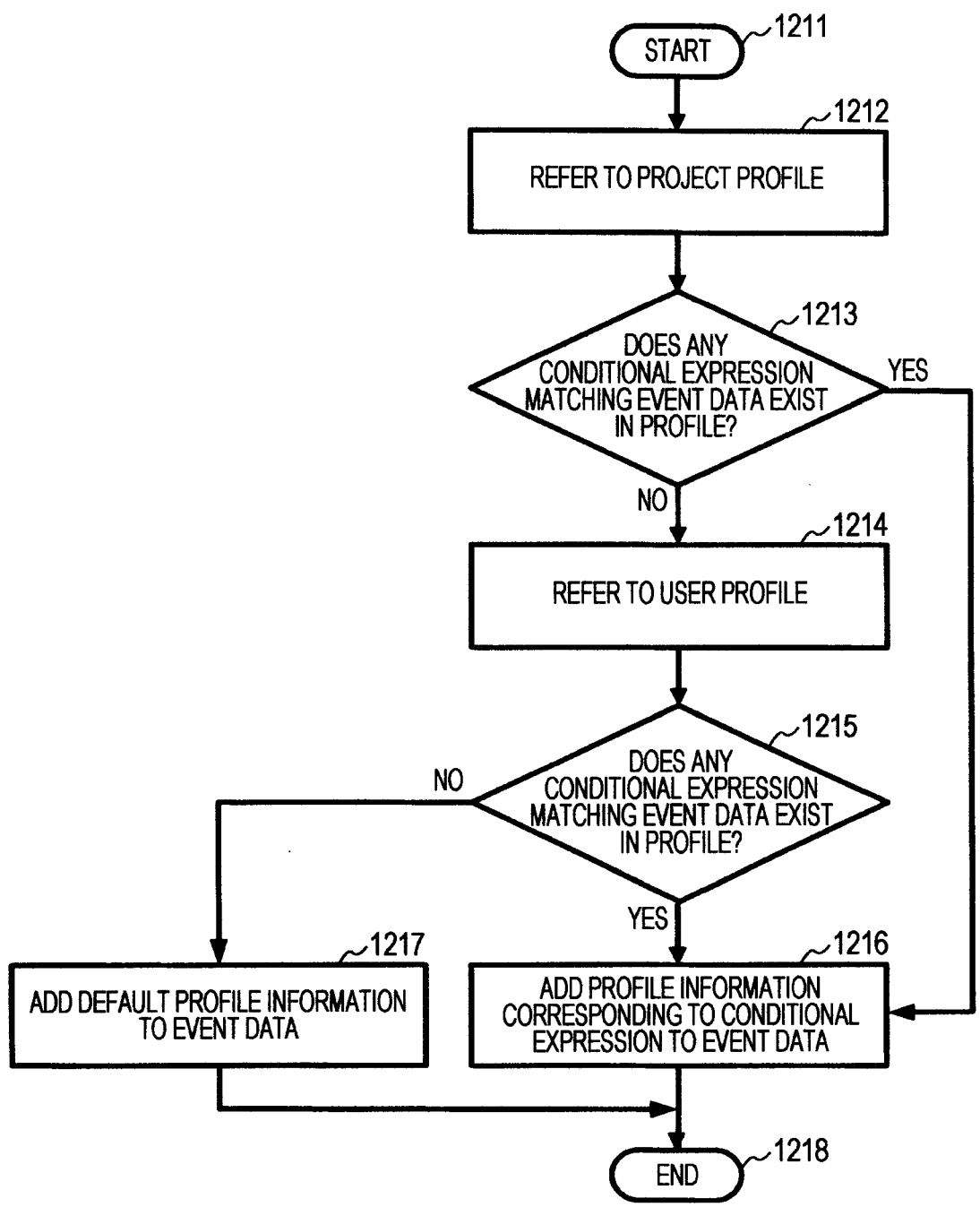

FIG. 12B illustrates a flowchart of a process of evaluating event data using a profile, and provides further detail for step 1005 of FIG. 10.

The flowchart illustrated in FIG. 12B is the same as the flowchart illustrated in FIG. 12A except that the sequence of steps corresponding to steps 1202 and 1204 in FIG. 12A is reversed. Thus, the description of steps in FIG. 12B is omitted here.

The profile determining means (913) may perform steps 1212 and 1214 at the same time. In this case, the profile determining means (913) may perform steps 1213 and 1215 at the same time as well.

FIG. 13 illustrates a flowchart of a process of adding event data to a queue, and provides further detail for step 1007 of FIG. 10.

In step 1301, the queue processing means (915) starts the process of adding event data to a queue.

In step 1302, the queue processing means (915) acquires a transfer time (which may include a date as well as a time) from the profile information of event data.

In step 1303, the queue processing means (915) determines whether the transfer time of the event data is earlier than a transfer time set for a queue. When the transfer time of the event data is earlier than the transfer time set for the queue, the queue processing means (915) causes the process to proceed to step 1304. On the other hand, when the transfer time of the event data is not earlier than the transfer time set for the queue, the queue processing means (915) causes the process to proceed to step 1305.

In step 1304, when the transfer time of the event data is earlier than the transfer time set for the queue, the queue processing means (915) updates the transfer time of the queue with the transfer time of the event data.

In step 1305, in response to the operation in step 1304, the queue processing means (915) stores the event data in the queue corresponding to the event.

In step 1306, the queue processing means (915) terminates the process of adding event data to a queue.

FIG. 14 illustrates a situation in which, according to an embodiment of the present invention, a plurality of pieces of event data in a queue are combined into a single notification (summary mail).

In a single notification (1401), an event description (1403) of event data with high importance is highlighted (displayed in a large font) relative to an event description (1402) of event data with low importance. Not only highlighting by the font size but also highlighting by a different color or font, highlighting by a rich text, or highlighting by a tag cloud may be adopted as the method for highlighting.

In a single notification (1411), an event description (1414) of event data with high importance is highlighted (displayed in a large font) relative to respective event descriptions (1412 and 1413) of pieces of event data with low importance. Moreover, the event description (1412) out of the event descriptions (1412 and 1413) of the pieces of event data with low importance is not displayed in the notification (1411), but a link indicating a place where the description is stored is provided in the notification (1411). An arrangement may be implemented by adopting a link, in which case the mail traffic is decreased by storing original event data in, for example, a server.

In a single notification (1424), an event description (indicating a state transition) (1422) of event data (Ev1) and an event description (indicating a state transition) (1423) of event data (Ev2) are combined to be displayed. Combining state transitions in this manner enables transmission of, for example, only the first and last pieces of information necessary for a team member, omitting information between the first and last pieces of information.

Japanese Unexamined Patent Application Publication No. 2007-4781 describes an information notification device notifying a user of a received electronic mail. The information notification device includes time detecting means for detecting a time, reaction detecting means for detecting a reaction of the user at the time of notifying the user of the mail, reaction history accumulating means for accumulating the time detected by the time detecting means and the reaction of the user detected by the reaction detecting means at the time of notifying the user of the mail as a reaction history, notification evaluation value calculating means for calculating, on the basis of the reaction histories accumulated in the reaction history accumulating means, a notification evaluation value indicating whether notifying the user of a mail is appropriate, in a manner that depends on the time, notification information accumulating means for accumulating a plurality of mails received from an external network medium, notification of the mails being necessary to be sent to the user, notification timing control means for including a future mail acquiring unit acquiring the receiving time of a future mail to be received from an external network medium at present or later, the notification timing control means determining, using the notification evaluation value calculated by the notification evaluation value calculating means and the receiving time of the future mail, whether the user is notified of all mails accumulated in the notification information accumulating means simultaneously at a predetermined time, in a manner that depends on the time detected by the time detecting means, and information notification means for notifying the user of all the mails accumulated in the notification information accumulating means simultaneously when the notification timing control means determines that the user is notified of all the mails accumulated in the notification information accumulating means simultaneously at the predetermined time.

Japanese Unexamined Patent Application Publication No. 11-184929 describes an electronic mail device with a scheduler. The electronic mail device with a scheduler compares schedule data included in a schedule mail with schedule data stored in schedule data storage means and causes, upon detecting that the pieces of schedule data overlap one another, electronic mail automatic transmission means to automatically transmit an electronic mail including information about a change in a schedule for avoiding the overlapping to the sender of the schedule mail.

Japanese Unexamined Patent Application Publication No. 2003-186807 describes an electronic mail receiving and processing system. The electronic mail receiving and processing system includes sorting category storing means for storing predetermined sorting categories for sorting received electronic mails, criterion storing means for storing a criterion for performing sorting using the categories, and a mail sorting unit sorting, into the categories, electronic mails received by an electronic mail receiving unit associated with the sorting category storing means and the criterion storing means on the basis of the criterion.

Japanese Unexamined Patent Application Publication No. 2002-207669 describes an information distribution apparatus mediating distribution of information from a sending apparatus to a receiving apparatus. The information distribution apparatus includes a distribution rank storage unit storing a distribution rank selected by each receiver with respect to distribution information from each sender, among distribution ranks defining distribution conditions including designation of a summarization degree of distribution information in a plurality of levels, a distribution information storage unit storing an original of distribution information from the sending apparatus, and a summarization processing unit acquiring, upon receiving a request for distribution of information from the sending apparatus through a sending/receiving control unit, a distribution rank selected by the receiver of the distribution information with respect to the distribution information from the sender from the distribution rank storage unit and performing summarization processing of distribution information stored in the distribution information storage unit in accordance with the designation of a summarization degree corresponding to the acquired distribution rank. The distribution information in accordance with the distribution rank is distributed from the sending/receiving control unit to each receiving apparatus.

Japanese Unexamined Patent Application Publication No. 2003-198627 describes a method for processing a notification. The method for processing a notification includes the step of storing, upon receiving content of a contents sender, a destination of the content, and a notification condition of a notification generated in relation to the content, the content, the destination, and the notification condition in a storage unit, the step of recording a usage of a system in the storage unit, the step of detecting occurrence of a specific event on the basis of at least the usage and the notification condition, and the notification state determining step of determining, upon detecting occurrence of the specific event, a notification mode regarding at least a notification destination and a notification time on the basis of at least the notification condition and a condition for a user to desire a notification, the user being a destination of content related to the specific event.

The invention claimed is:

1. A server that sends a notification of an event and can be connected to a plurality of clients computers via a network, the server comprising:
 a computer comprising a processor; and
 instructions which are executable, using the processor, to perform functions comprising:
  receiving, in response to occurrence of an event, a notification corresponding to the event;
  storing in a queue, when event data generated from the received notification matches a conditional expression in a profile associated with the event, the event data, wherein the queue is associated with at least one of change management information corresponding to the event and a recipient of the change management information, the event data stored in the queue including a transfer time set on the basis of the profile, further comprising:
   updating, in a case where a transfer time is set for the queue in which the event data is stored, when the transfer time set in the event data is earlier than the transfer time set for the queue, the transfer time set for the queue with the transfer time set in the event data; and
   setting, in a case where no transfer time is set for the queue in which the event data is stored, the transfer time set in the event data as the transfer time for the queue; and
  sending, when a determined transfer time has come, all the pieces of event data stored in the queue to a client that is the recipient as a single notification, the determined transfer time comprising an earliest time out of transfer times set in respective pieces of event data stored in the queue or an earliest time out of transfer times for the queue.

2. The server according to claim 1, wherein the server is a server of a change management system, a task management system, a project management system, a quality control system, a bug management system, a fault management system, or a track management system.

3. The server according to Claim 1, wherein the sending is performed at the transfer time set for the queue.

4. The server according to claim 1, wherein the single notification includes an event description of event data in which high importance is set and an attribute for setting the event description of the event data to be highlighted when displayed for the recipient.

5. The server according to claim 1, wherein the queue is associated with the change management information corresponding to the event and the at least one recipient.

6. The server according to claim 1, wherein the storing further comprises storing the event data in a plurality of queues.

7. The server according to claim 1, wherein the sending further comprises sending the single notification to clients that are a plurality of recipients associated with the queue.

8. The server according to claim 1, wherein the profile includes a user profile of the recipient, a project profile, or a combination of the user profile and the project profile.

9. The server according to claim 1, wherein the profile is a user profile of the recipient, and the user profile includes at least one conditional expression associated with an electronic calendar and a transfer time associated with the conditional expression.

10. A computer program product for causing a computer to send a notification of an event to a destination client, the computer program product embodied on non-transitory computer readable storage and comprising computer-readable program code for performing:
 receiving, at the server from an originating client in response to occurrence of an event, a notification corresponding to the event into a storage unit;
 storing, in response to a generation of event data generated from the received notification and matching a conditional expression in a profile associated with the event, the event data in a queue associated with at least one of change management information corresponding to the event and a recipient of the change management information, the storing comprising setting a transfer time in the event data on a basis of the profile, further comprising:
  updating, in a case where a transfer time is set for the queue in which the event data is stored, when the transfer time set in the event data is earlier than the transfer time set for the queue, the transfer time set for the queue with the transfer time set in the event data; and
  setting, in a case where no transfer time is set for the queue in which the event data is stored, the transfer time set in the event data as the transfer time for the queue; and sending, when a determined transfer time has come, all the pieces of event data stored in the queue, to the destination that is the recipient, as a single notification, the determined transfer time comprising an earliest time out of transfer times set in respective pieces of event data stored in the queue or an earliest time out of transfer times for the queue.

11. The computer program product according to claim 10, wherein the event data comprises updating information corresponding to the event, the updating information comprising a name of an attribute updated by a user at the originating client and before and after values of the attribute.

12. The computer program product according to claim 10, wherein setting the transfer time further comprises setting importance in the event data on the basis of the profile.

13. The computer program product according to claim 12, wherein:
the single notification includes: (1) an event description of event data, when high importance is set for the event data, 2) a link indicating a place where event data is stored, when low importance is set for the event data, (3) a summary of the event data as the event description, when low importance is set for the event data, or (4) the event description of the event data, when low importance is set for the event data; and an attribute for setting a display of the event description of the event data, when low importance is set for the event data, the attribute indicating that the event description of the event data for which low importance is set is to be displayed at a small scale relative to display of the event description of other event data for which high importance is set.

14. The computer program product according to claim 10, wherein the single notification includes a description in which respective event descriptions of a plurality of pieces of event data are summarized.

15. The computer program product according to claim 10, wherein the storing further comprises preparing, when no queue for the change management information corresponding to the event exists, a queue for the change management information corresponding to the event in a memory.

16. The computer program product according to claim 10, wherein the profile is a project profile, and the project profile includes at least one conditional expression associated with a project and a transfer time associated with the conditional expression.

17. The computer program product according to claim 10, wherein the profile is a project profile, and the project profile includes at least one conditional expression associated with an electronic calendar and a transfer time associated with the conditional expression.

18. The computer program product according to claim 17, wherein the project profile further includes importance associated with the conditional expression.

* * * * *